United States Patent
Liu et al.

(10) Patent No.: US 9,439,060 B2
(45) Date of Patent: Sep. 6, 2016

(54) METHOD AND APPARATUS FOR SELECTED INTERNET PROTOCOL (IP) TRAFFIC OFFLOAD (SIPTO) AND LOCAL IP ACCESS (LIPA) MOBILITY

(75) Inventors: Kai Liu, S. Huntington, NY (US); Peter S. Wang, E. Setauket, NY (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1008 days.

(21) Appl. No.: 13/538,732

(22) Filed: Jun. 29, 2012

(65) Prior Publication Data

US 2013/0003699 A1     Jan. 3, 2013

Related U.S. Application Data

(60) Provisional application No. 61/503,711, filed on Jul. 1, 2011.

(51) Int. Cl.
    *H04W 8/08*               (2009.01)
    *H04W 36/00*            (2009.01)
    (Continued)

(52) U.S. Cl.
    CPC ......... *H04W 8/082* (2013.01); *H04W 36/0061* (2013.01); *H04W 80/04* (2013.01); *H04W 36/0083* (2013.01); *H04W 48/20* (2013.01); *H04W 84/045* (2013.01)

(58) Field of Classification Search
CPC ............... H04W 80/04; H04W 36/18; H04W 36/0011; H04W 36/14; H04W 36/08; H04W 84/12; H04W 88/06; H04W 88/08; H04W 84/18
USPC .................................................. 370/331, 328
See application file for complete search history.

(56) References Cited

U.S. PATENT DOCUMENTS

| | | | |
|---|---|---|---|
| 8,538,433 B2 * | 9/2013 | Kekki ................... | H04W 48/17 370/310 |
| 2010/0041405 A1 * | 2/2010 | Gallagher et al. ............ | 455/436 |

(Continued)

FOREIGN PATENT DOCUMENTS

| | | |
|---|---|---|
| WO | 2008/132163 | 11/2008 |
| WO | 2010/113528 | 10/2010 |
| WO | 2010/119707 | 10/2010 |

OTHER PUBLICATIONS

Rebecchi et al., "Data Offloading Techniques in Cellular Networks: A Survey. Communications Surveys and Tutorials," IEEE Communications Society, Institute of Electrical and Electronics Engineers (IEEE), 2014, pp. 1-25. <hal-01081713v1> (https://hal.archives-ouvertes.fr/hal-01081713/document).*

(Continued)

*Primary Examiner* — Timothy J Weidner
(74) *Attorney, Agent, or Firm* — Quasim A Shah

(57) ABSTRACT

Methods and apparatus are described for supporting wireless transmit/receive unit (WTRU) mobility between Home (evolved) Node Bs (H(e)NBs) that are configured to communicate with a Local Gateway (L-GW). The H(e)NBs and/or L-GW may belong to one or more Local H(e)NB Networks (LHNs). A WTRU may receive services including Selected Internet Protocol (IP) Traffic Offload (SIPTO) or Local IP Access (LIPA) services from the L-GW via one or more H(e)NBs. The WTRU may continue to receive SIPTO or LIPA services after a handover to another H(e)NB that may be in communication with the same L-GW and may belong to the same LHN. The WTRU may receive information related to the LHN or the L-GW to allow continuation of SIPTO or LIPA services as the WTRU moves among H(e)NBs and/or out of the LHN. The WTRU may receive and/or maintain one or more LHN Lists.

20 Claims, 13 Drawing Sheets

(51) Int. Cl.
  *H04W 80/04* (2009.01)
  *H04W 48/20* (2009.01)
  *H04W 84/04* (2009.01)

(56) References Cited

U.S. PATENT DOCUMENTS

| | | | |
|---|---|---|---|
| 2010/0195621 A1* | 8/2010 | Kekki et al. | 370/332 |
| 2012/0076121 A1* | 3/2012 | Choi et al. | 370/338 |
| 2013/0010753 A1* | 1/2013 | Chen | H04W 36/0066 370/331 |
| 2013/0010756 A1* | 1/2013 | Liang et al. | 370/331 |
| 2013/0028237 A1* | 1/2013 | Cheng et al. | 370/331 |
| 2014/0321429 A1* | 10/2014 | Enomoto et al. | 370/331 |

OTHER PUBLICATIONS

NEC, "Architectural Requirements for SIPTO for the Local Network," 3GPP TSG SA WG2 Meeting #83,S21-111270 (Feb. 21-25, 2011), submitted with IDS (Jul. 9, 2012).*

Alcatel-Lucent et al., "Various ways to access the Local Network from Macro Cellular," 3GPP TSG-SA WG1 Meeting #54, S1-111204 (May 9-13, 2011).

NEC, "Architectural Requirements for SIPTO for the local network," 3GPP TSG SA WG2 Meeting #83, S2-111270 (Feb. 21-25, 2011).

SA WG2, "New WID: LIPA Mobility and SIPTO at the Local Network," TSG SA Meeting #50, SP-100705 (Dec. 13-15, 2010).

Third Generation Partnership Project, "Specification Group Radio Access Network; Evolved Universal Terrestrial Radio Access (E-UTRA); User Equipment (UE) procedures in idle mode (Release 9)," 3GPP TS 36.304 V9.10.0 (Mar. 2012).

Third Generation Partnership Project, "Specification Group Radio Access Network; Evolved Universal Terrestrial Radio Access (E-UTRA); User Equipment (UE) procedures in idle mode (Release 10)," 3GPP TS 36.304 V10.5.0 (Mar. 2012).

Third Generation Partnership Project, "Technical Specification Group Services and System Aspects; Local IP Access and Selected IP Traffic Offload (LIPA-SIPTO) (Release 10)," 3GPP TR 23.829 V10.0.1 (Oct. 2011).

Third Generation Partnership Project, "Technical Specification Group Services and System Aspects; Local IP Access and Selected IP Traffic Offload (LIPA-SIPTO) (Release 10)," 3GPP TR 23.829 V10.0.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).

Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).

Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).

Third Generation Partnership Project, "Technical Specification Group Services and System Aspects; General Packet Radio Service (GPRS); Service description; Stage 2 (Release 8)," 3GPP TS 23.060 V8.15.0 (Mar. 2012).

Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).

Third Generation Partnership Project, "Technical Specification Group Services and System Aspects; General Packet Radio Service (GPRS); Service description; Stage 2 (Release 9)," 3GPP TS 23.060 V9.12.0 (Mar. 2012).

Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).

Third Generation Partnership Project, "Technical Specification Group Services and System Aspects; General Packet Radio Service (GPRS); Service description; Stage 2 (Release 8)," 3GPP TS 23.060 V8.13.0 (Jun. 2011).

Third Generation Partnership Project, "Technical Specification Group Services and System Aspects; General Packet Radio Service (GPRS); Service description; Stage 2 (Release 9)," 3GPP TS 23.060 V9.9.0 (Jun. 2011).

Third Generation Partnership Project, "Technical Specification Group Services and System Aspects; General Packet Radio Service (GPRS); Service description; Stage 2 (Release 10)," 3GPP TS 23.060 V10.8.1 (Jun. 2012).

Third Generation Partnership Project, "Technical Specification Group Services and System Aspects; General Packet Radio Service (GPRS); Service description; Stage 2 (Release 10)," 3GPP TS 23.060 V10.4.0 (Jun. 2011).

Third Generation Partnership Project, "Technical Specification Group Services and System Aspects; General Packet Radio Service (GPRS); Service description; Stage 2 (Release 11)," 3GPP TS 23.060 V11.2.0 (Jun. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.0 (Jun. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.13.0 (Jun. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.8.0 (Jun. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 1)," 3GPP TS 23.401 V11.2.0 (Jun. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.4.0 (Jun. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.9.0 (Jun. 2011).

Third Generation Partnership Project, "Technical Specification Group Services and System Aspects; LIPA Mobility and SIPTO at the Local Network; (Release 12)," 3GPP TR 23.859 V0.5.0 (May 2012).

Third Generation Partnership Project, "Technical Specification Group Services and System Aspects; LIPA Mobility and SIPTO at the Local Network; (Release 11)," 3GPP TR 23.859 V0.2.0 (Apr. 2011).

Third Generation Partnership Project, "Technical Specification Group Radio Access Network; ULTRAN Iuh interface Home Node B (HNB) Application Part (HNBAP) Signaling (Release 8)," 3GPP TS 25.469 V8.5.0 (Mar. 2010).

(56) References Cited

OTHER PUBLICATIONS

Third Generation Partnership Project, "Technical Specification Group Radio Access Network; UTRAN Iuh interface Home Node B (HNB) Application Part (HNBAP) signaling (Release 9)," 3GPP TS 25.469 V9.3.0 (Sep. 2010).
Third Generation Partnership Project, "Technical Specification Group Radio Access Network; UTRAN Iuh interface Home Node B (HNB) Application Part (HNBAP) signaling (Release 10),"3GPP TS 25.469 V10.1.0 (Jun. 2011).
Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).
Third Generation Partnership Project, "Technical Specification Group Radio Access Network; User Equipment (UE) procedures in idle mode and procedures for cell reselection in connected mode (Release 7)," 3GPP TS 25.304 V7.8.0 (Sep. 2009).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network; User Equipment (UE) procedures in idle mode and procedures for cell reselection in connected mode (Release 1999)," 3GPP TS 25.304 V13.14.0 (Mar. 2004).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.10.0 (Jun. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V8.10.0 (Jun. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V8.11.0 (Dec. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.7.0 (Jun. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.10.0 (Mar. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.3.0 (Jun. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V10.7.0 (Jun. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.3.0 (Jun. 2012).
Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.7.0 (Jun. 2011).
Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.2.0 (Jun. 2011).
Third Generation Partnership Project, "Technical Specification Group Radio Access Network; User Equipment (UE) procedures in idle mode and procedures for cell reselection in connected mode (Release 8)," 3GPP TS 25.304 V8.12.0 (Jun. 2011).
Third Generation Partnership Project, "Technical Specification Group Radio Access Network; User Equipment (UE) procedures in idle mode and procedures for cell reselection in connected mode (Release 9)," 3GPP TS 25.304 V9.5.0 (Jun. 2011).
Third Generation Partnership Project, "Technical Specification Group Radio Access Network; User Equipment (UE) procedures in idle mode and procedures for cell reselection in connected mode (Release 9)," 3GPP TS 25.304 V9.7.0 (Dec. 2011).
Third Generation Partnership Project, "Technical Specification Group Radio Access Network; User Equipment (UE) procedures in idle mode and procedures for cell reselection in connected mode (Release 10)," 3GPP TS 25.304 V10.1.0 (Jun. 2011).
Third Generation Partnership Project, "Technical Specification Group Radio Access Network; User Equipment (UE) procedures in idle mode and procedures for cell reselection in connected mode (Release 10)," 3GPP TS 25.304 V10.4.0 (Mar. 2012).
Ericsson, "CN Centric Load Re-distribution with A/Gb/Iu-flex," 3GPP TSG-SA WG2 Meeting #45, S2-050715, Beijing, China (Apr. 4-8, 2005).
Interdigital Communications, "Clarifying usage of CSG information in LIPA local network," 3GPP TSG SA WG2 Meeting #85, S2-112563, Xian, China (May 16-20, 2011).
Panasonic, "LIPA mobility support with standalone LGW," 3GPP TSG SA WG2 Meeting #83, S2-110682, Salt Lake City, Utah, USA (Feb. 21-25, 2011).
Third Generation Partnership Project, "Specification Group Radio Access Network; Evolved Universal Terrestrial Radio Access (E-UTRA); User Equipment (UE) procedures in idle mode (Release 10)," 3GPP TS 36.304 V10.2.0 (Mar. 2012).
Third Generation Partnership Project, "Technical Specification Group Services and System Aspects; General Packet Radio Service (GPRS) enhancements for Evolved Universal Terrestrial Radio Access Network (E-TRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.00 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.2.0 (Jun. 2012).
Third Generation Partnership Project, "Technical Specification Group Radio Access Network; UTRAN Iuh interface Home Node B (HNB) Application Part (HNBAP) signaling (Release 8)," 3GPP TS 25.469 V8.5.0 (Mar. 2010).
Third Generation Partnership Project, "Technical Specification Group Radio Access Network; UTRAN Iuh interface Home Node B (HNB) Application Part (HNBAP) signaling (Release 10)," 3GPP TS 25.469 V10.1.0 (Jun. 2011).
Third Generation Partnership Project, "Technical Specification Group Radio Access Network; User Equipment (UE) procedures in idle mode and procedures for cell reselection in connected mode (Release 1999)," 3GPP TS 25.304 V3.14.0 (Mar. 2004).
Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 8)," 3GPP TS 29.274 V8.10.0 (Jun. 2011).
Third Generation Partnership Project, "Technical Specification Group Core Network and Terminals; 3GPP Evolved Packet System

(56) References Cited

OTHER PUBLICATIONS (EPS); Evolved General Packet Service (GPRS) Tunnelling Protocol for Control plane (GTPv2-C); Stage 3 (Release 8)," 3GPP TS 29.274 V8.11.0 (Dec. 2011).

Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 9)," 3GPP TS 29.274 V9.7.0 (Jun. 2011).

Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 9)," 3GPP TS 29.274 V9.10.0 (Mar. 2012).

Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 10)," 3GPP TS 29.274 V10.3.0 (Jun. 2011).

Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 8)," 3GPP TS 29.274 V10.7.0 (Jun. 2012).

Third Generation Partnership Project, "Technical Specification Group Core Network and Terminals; 3GPP Evolved Packet System (EPS); Evolved General Packet Service (GPRS) Tunnelling Protocol for Control plane (GTPv2-C); Stage 3 (Release 11)," 3GPP TS 29.274 V11.3.0 (Jun. 2012).

"3rd Generation Partnership Project; Technical Specification Group Services and System Aspects; General Packet Radio Services (GPRS); Service Description Stage 2 (Release 10)", 3GPP TS 23.060 V10.3.0, Mar. 2011, 320 pages.

"3rd Generation Partnership Project; Technical Specification Group Services and System Aspects; LIPA Mobility and SIPTO at the Local Network; (Release 11)", 3GPP TR 23.859 V0.4.0, Jul. 2011 (with Marking to show version of 3GPP TR 23.859 V0.3.1, Jun. 2011), 56 pages.

\* cited by examiner

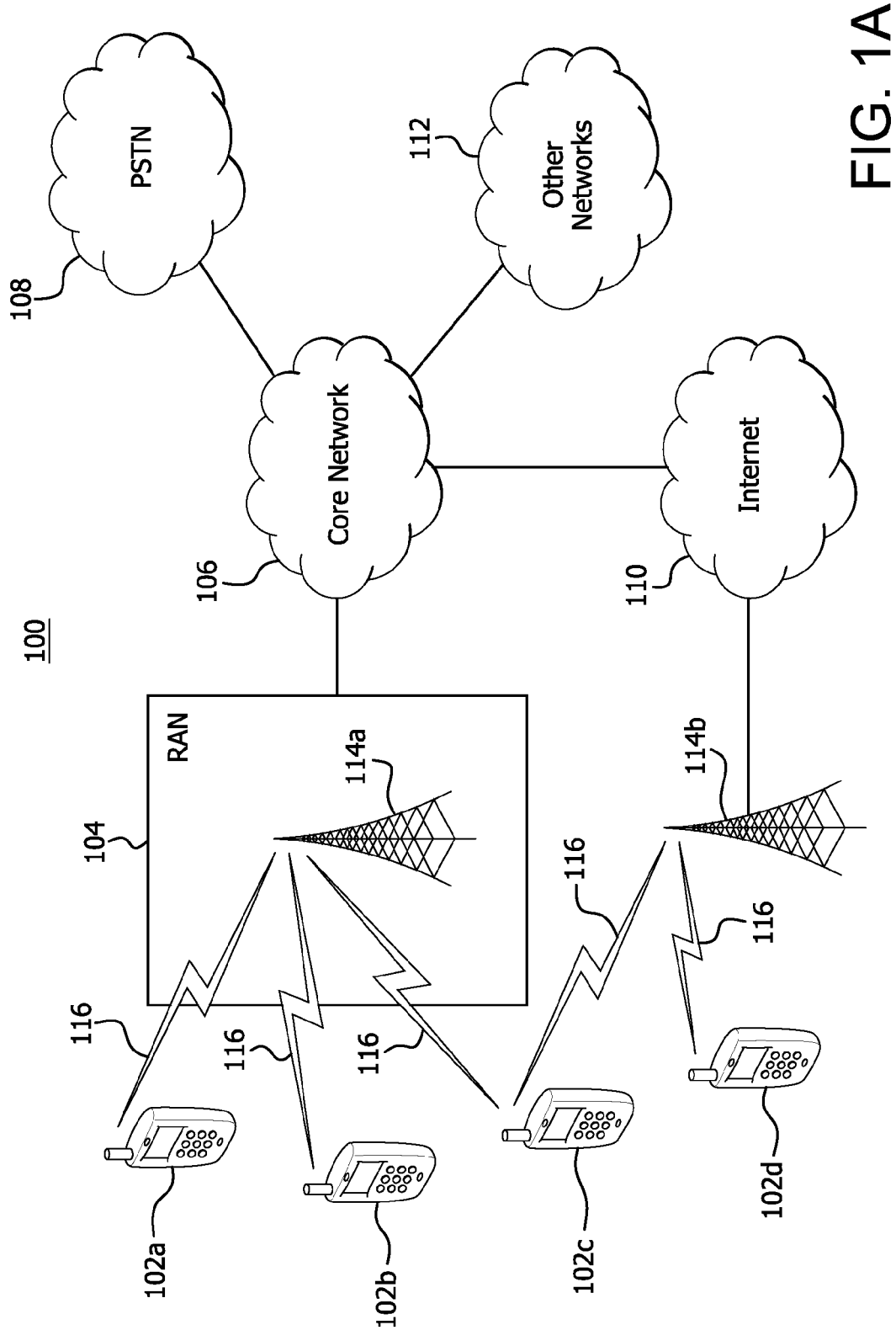

METHOD AND APPARATUS FOR SELECTED INTERNET PROTOCOL (IP) TRAFFIC OFFLOAD (SIPTO) AND LOCAL IP ACCESS (LIPA) MOBILITY

CROSS REFERENCE TO RELATED APPLICATIONS

This application claims the benefit of U.S. Provisional Application No. 61/503,711, filed Jul. 1, 2011, the content of which is hereby incorporated by reference herein.

BACKGROUND

Selected Internet Protocol (IP) traffic offload (SIPTO) is a method to offload traffic from a wireless communication system operator's core network (CN) to a defined IP network that is close to a point of attachment to the access point of a wireless transmit receive unit (WTRU). The traffic may be offloaded to another path based on the geographical (or topological in terms of IP) location of a WTRU. Thus, a goal of SIPTO is to offload some of the IP traffic from traversing nodes at the CN. Local IP Access (LIPA) is a method for providing access for IP-capable WTRUs that are connected via an H(e)NB (for example, using H(e)NB radio access) to other IP capable entities in the same residential or enterprise IP network. Traffic for LIPA typically does not traverse the mobile operator's network except for accessing particular information at the H(e)NB. A packet data network (PDN) connection established for the WTRU may be used for SIPTO and/or LIPA without the WTRU being aware of the use of SIPTO and/or LIPA.

In a wireless network capable of providing SIPTO or LIPA services, a Local Gateway (L-GW) may be located apart from an H(e)NB. Accordingly, a WTRU may be capable of moving between H(e)NBs while still maintaining a connection to one L-GW. The WTRU may therefore be able to continue to receive SIPTO or LIPA services while moving between H(e)NBs. Local H(e)NB Networks (LHNs) are networks that include one or more H(e)NBs that are in communication with a given L-GW. A LHN may also include H(e)NBs that belong to more than one Closed Subscriber Group (CSG). Based on the separation of the L-GW from the H(e)NBs and the potential handover of the WTRU between more than one H(e)NB, methods are needed to support WTRU mobility between H(e)NBs and to support SIPTO and/or LIPA services during WTRU mobility.

SUMMARY

Methods and apparatus are described for supporting wireless transmit/receive unit (WTRU) mobility between Home (evolved) Node Bs (H(e)NBs) that are configured to communicate with a Local Gateway (L-GW). The H(e)NBs and/or L-GW may belong to one or more Local H(e)NB Networks (LHNs). A WTRU may receive services including Selected Internet Protocol (IP) Traffic Offload (SIPTO) or Local IP Access (LIPA) services from the L-GW via one or more H(e)NBs. The WTRU may continue to receive SIPTO or LIPA services after a handover to another H(e)NB that may be in communication with the same L-GW and may belong to the same LHN. The WTRU may receive information related to the LHN or the L-GW to allow continuation of SIPTO or LIPA services as the WTRU moves among H(e)NBs and/or out of the LHN. The WTRU may receive and/or maintain one or more LHN Lists.

BRIEF DESCRIPTION OF THE DRAWINGS

A more detailed understanding may be had from the following description, given by way of example in conjunction with the accompanying drawings wherein:

FIG. 1A shows an example communications system in which one or more disclosed embodiments may be implemented;

DETAILED DESCRIPTION

Figure 1B:
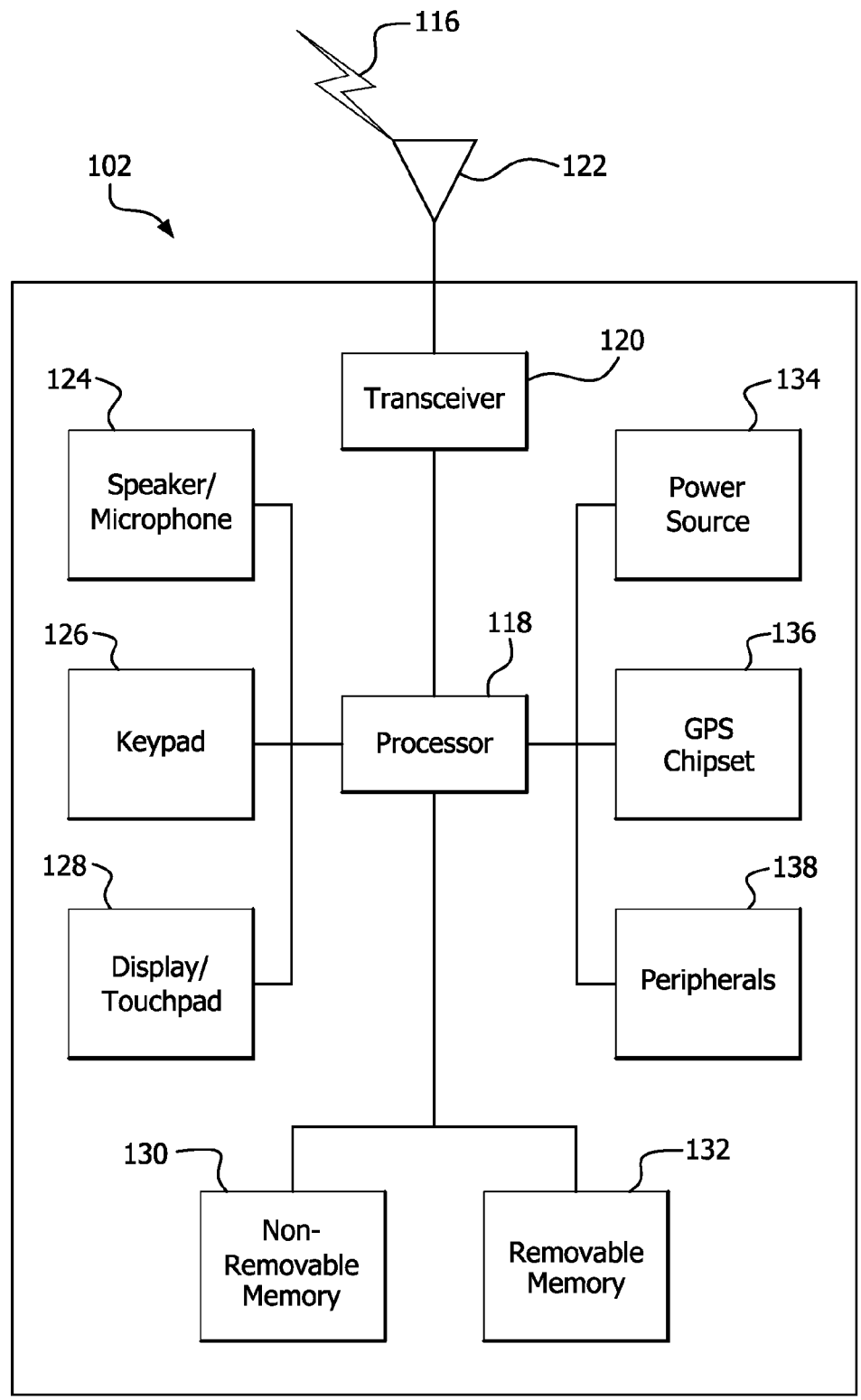
FIG. 1B shows an example wireless transmit/receive unit (WTRU) that may be used within the communications system shown in FIG. 1A.

When referred to hereafter, the terminology "wireless transmit/receive unit (WTRU)" includes but is not limited to a user, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
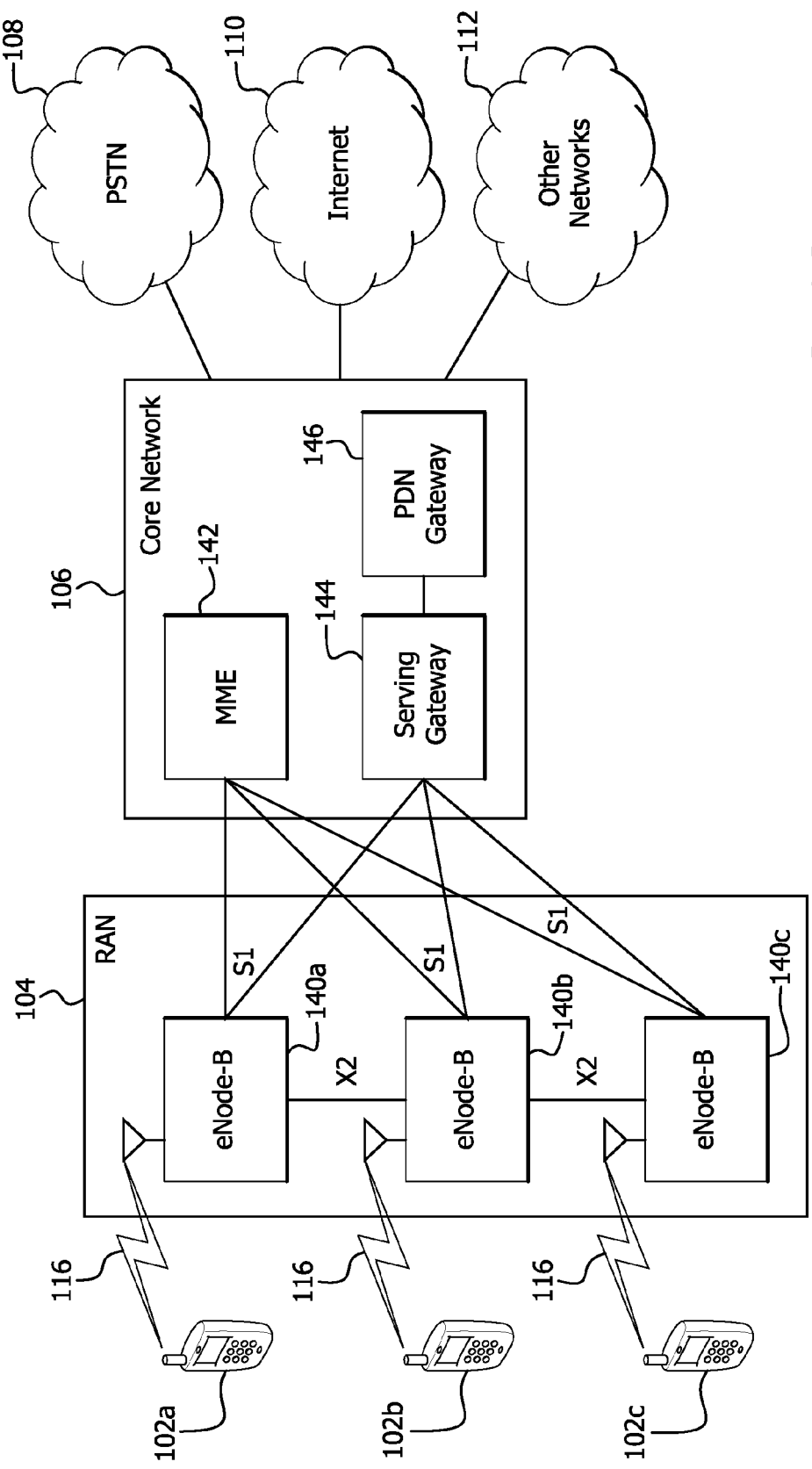
FIG. 1C shows an example radio access network and an example core network (CN) that may be used within the communications system shown in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may be configured to perform SIPTO or LIPA services. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Selected Internet protocol (IP) traffic offload (SIPTO) and local IP access (LIPA) services may be provided in any type of network and may use any type of radio access technology. For example, SIPTO and LIPA may be used in a universal mobile telephone system (UMTS) terrestrial radio access network (UTRAN) as well as an LTE network. The architecture used for SIPTO and LIPA in a UTRAN or LTE network may be similar. Accordingly, although descriptions herein may refer to a particular technology, the descriptions are for exemplary purposes only and one skilled in the art will appreciate that the descriptions may be applied to any technology capable of using SIPTO or LIPA services.

As described above, SIPTO is a method to offload traffic from a CN to a defined IP network. When reference is made to a core network with respect to the data plane, the nodes under consideration may include the serving gateway (S-GW) and the packet data network (PDN) gateway (P-GW) in, for example, an LTE-compliant system, or the serving general packet radio service (GPRS) support node (SGSN) and gateway GPRS support node (GGSN) in a UTRAN, although the disclosure herein is not limited to any one network architecture or technology. SIPTO may require that a WTRU processes both offloaded traffic and non-offloaded (non-SIPTO) traffic that goes through the operator's network. SIPTO may be used in, for example, a UTRAN, an evolved UTRAN (E-UTRAN), and/or a macro cell with a home eNodeB (HeNB), for example.

Figure 2:
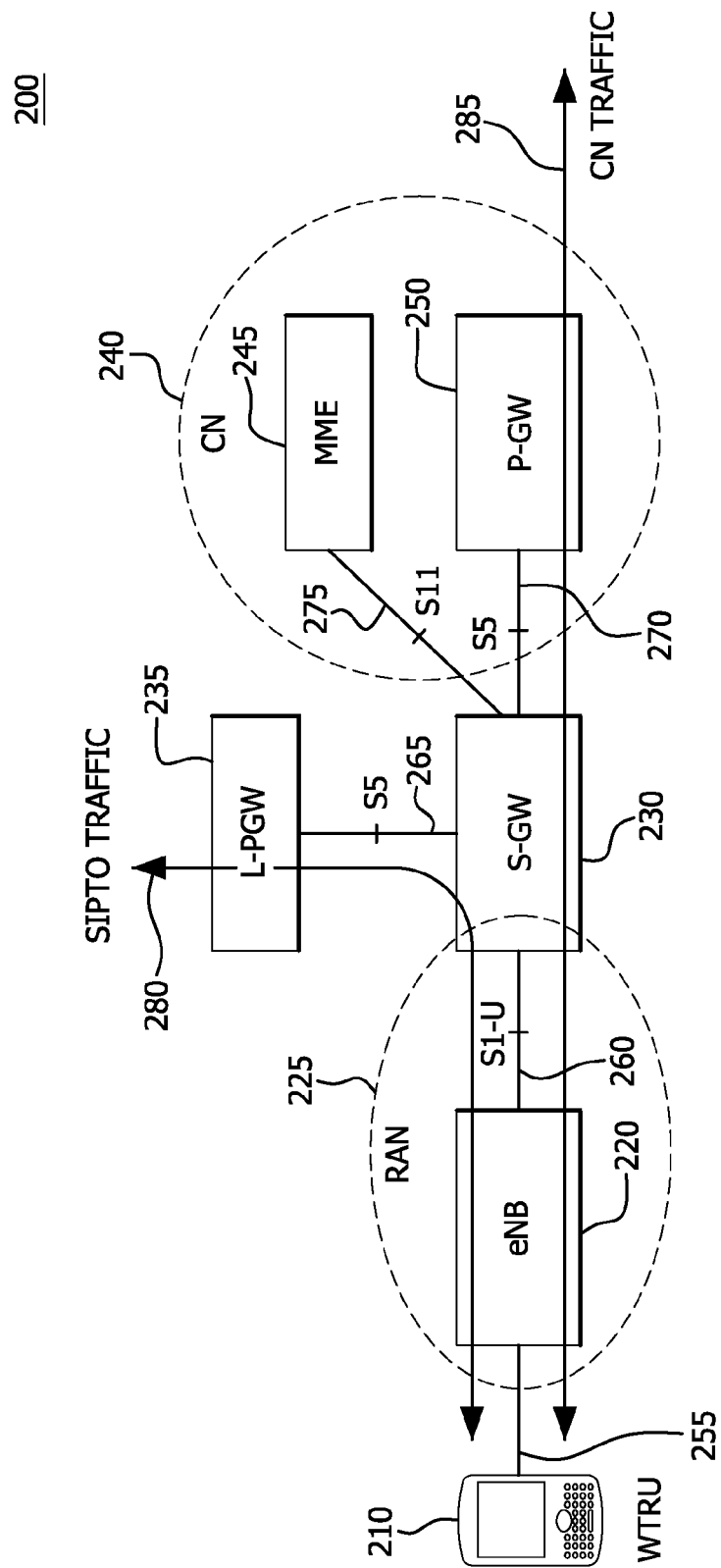
FIG. 2 is an example architecture of a wireless network configured to perform Selected IP Traffic Offload (SIPTO)

FIG. 2 shows an example wireless network 200 configured to provide SIPTO services. The network 200 includes a WTRU 210 in communication with an eNB 220 that is located in a radio access network (RAN) 225. The eNB 220 is also in communication with an S-GW 230, which is also in communication with a local packet gateway (L-PGW) 235 and a core network (CN) 240. The CN 240 includes an MME 245 and a packet data network (PDN) gateway (P-GW) 250.

The WTRU 210 communicates with the eNB 220 over a wireless air interface 255. The eNB 220 also communicates with the S-GW 230 over an S1-U interface 260. The S-GW 230 communicates with the L-PGW 235 over an S5 interface 265, and with the P-GW 250 over an S5 interface 270. The S-GW 230 also communicates with the MME 245 over an S11 interface 275. Two traffic streams are also shown, a SIPTO traffic stream 280 that is routed through the S-GW 230 to the L-PGW 235, and a CN traffic stream 285 that is routed through the S-GW 230 to the P-GW 250 in the CN 240.

The eNB 220 may also be a HeNB configured to perform SIPTO in a home network of the user of the WTRU 210. In that case, traffic may be offloaded locally to a user's home network. The home network may be an IP network that is connected to other devices such as a printer, a television, and a personal computer, for example. These nodes on the home network may be using private addressing.

Also, the wireless network 200 may be configured to provide Local IP Access (LIPA). While many of the features disclosed herein are described with regard to SIPTO, they may also be applied to LIPA and SIPTO systems for HeNBs. For example, SIPTO or LIPA may include single or multiple PDN connections, deployment behind network address translation (NAT), and the like.

Furthermore, for traffic going through the mobile operator's core network, the S-GW 230 user plane functions may be located within the CN 240. Also, mobility management signalling between a WTRU 210 and the network may be handled in the CN 240. Session management signalling, such as bearer setup for SIPTO or LIPA traffic, and traffic going through the CN 240 may terminate in the CN 240. Also, reselection of a WTRU's offload point for SIPTO traffic that is geographically or topologically close to the WTRU 210 may be possible during idle mode mobility procedures.

The SIPTO system may include a local gateway (L-GW) that is close to a WTRU's point of attachment to the access network. The L-GW may perform IP traffic offload based on some policy or configuration, for example, based on the IP address destination. IP traffic may go through the L-GW rather than through the operator's core network via, for example, an S-GW and a P-GW or via an SGSN and a GGSN (not shown).

Depending on the network technology, a local break point or local gateway may be in the HeNB subsystem or in a radio network controller (RNC). Also, the SGSN may be responsible for both control and user planes in some networks, while the user and control planes may be taken care of by a MME and an S-GW in others.

An L-GW, such as the L-PGW 235, may have certain functionalities of a PDW/GGSN. For example, the L-GW may have the following functionalities: IP address allocation; direct tunneling with the RAN 225 in connected mode; per WTRU policy-based packet filtering; or rate policing/shaping. In order to perform SIPTO transfers to a network, such as a local network or Intranet, for example, a proper PDN connection may be required. A WTRU may set an access point name (APN) to a specific value when requesting a PDN connection or when requesting the establishment of a packet data protocol (PDP) context.

Figure 3:
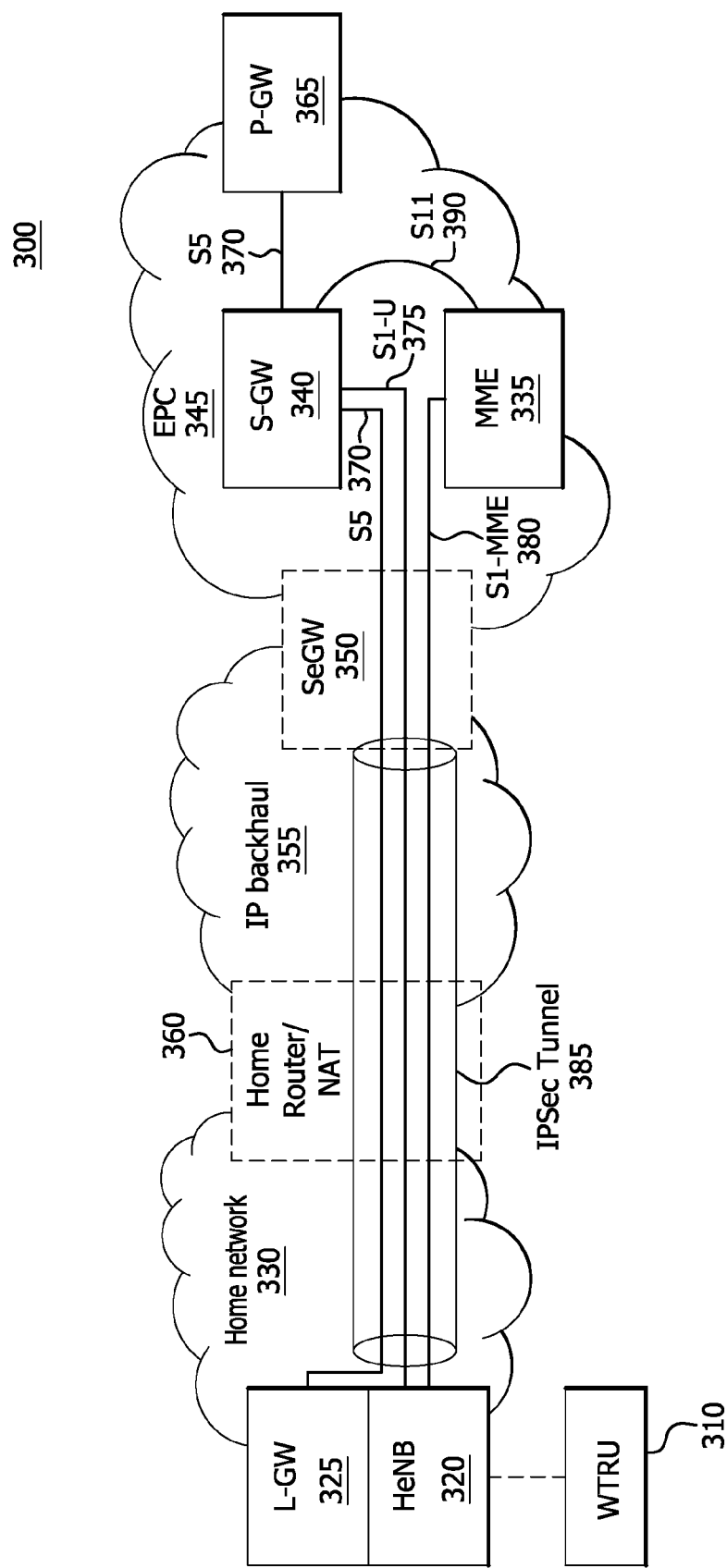
FIG. 3 shows an example wireless network configured to provide Local IP Access (LIPA) services.

FIG. 3 shows an example wireless network 300 configured to provide LIPA services. A WTRU 310 may be in communication with a HeNB 320. The HeNB 320 may be collocated with an L-GW 325. The HeNB 320 and the L-GW 325 may be located at a home network 330. A MME 335 and an S-GW 340 may be located at the Evolved Packet Core (EPC) 345. A Security Gateway (SeGW) 350 may be located at the edge of an operator's core network. The SeGW 350 may maintain a secure connection with the HeNB 320 across an IP backhaul network 355. A Home Router/NAT device 360 may be located at a boundary of the home network 330 and the IP backhaul network 355. A P-GW 365 is also shown.

The L-GW 325 may communicate with the S-GW 340 over an S5 interface 370. The WTRU 310 may be paged by sending a packet (for example, a downlink user packet or any other packet) to the L-GW 325 over the S5 interface 370. Downlink user packets may be buffered in the L-GW 325. Packets buffered at the L-GW 325 may be forwarded to the HeNB 320 over a direct link. The HeNB 320 may communicate with the S-GW 340 over an S1-U interface 375. Packets buffered at the S-GW 340 may be forwarded to the HeNB 320 over the S1-U interface 375. The MME 335 may communicate with the HeNB 320 over an S1-MME interface 380. Communications over the S5 interface 370, the S1-U interface 375, and the S1-MME interface 380 may be tunneled via an IPSec Tunnel 385.

To perform mapping of enhanced radio access bearer (E-RAB) IDs at the HeNB 320 with the Evolved Packet System (EPS) Bearer IDs at the L-GW 325, the S5 interface 370 P-GW tunnel endpoint identifier (TEID) (user plane) parameter may be used as correlation information. For example, the TEID may be signaled across the S1-MME interface 380 to the HeNB 320. Candidate messages may include an INITIAL CONTEXT SETUP REQUEST, an E-RAB SETUP REQUEST, or the like. IKEv2 mechanisms may be used to request one IP address each for the HeNB 320 and the L-GW 325 function. The assigned L-GW address may be signaled to the MME 335 via the S1-MME interface 380 in, for example, WTRU-associated signaling messages. The MME 335 may use the information from the HeNB 320 to override the normal L-GW 325 selection algorithm. The S-GW 340 may communicate with the P-GW 365 over an S5 interface 370. The S-GW 340 may communicate with the MME 335 over an S11 interface 390.

Figure 4:
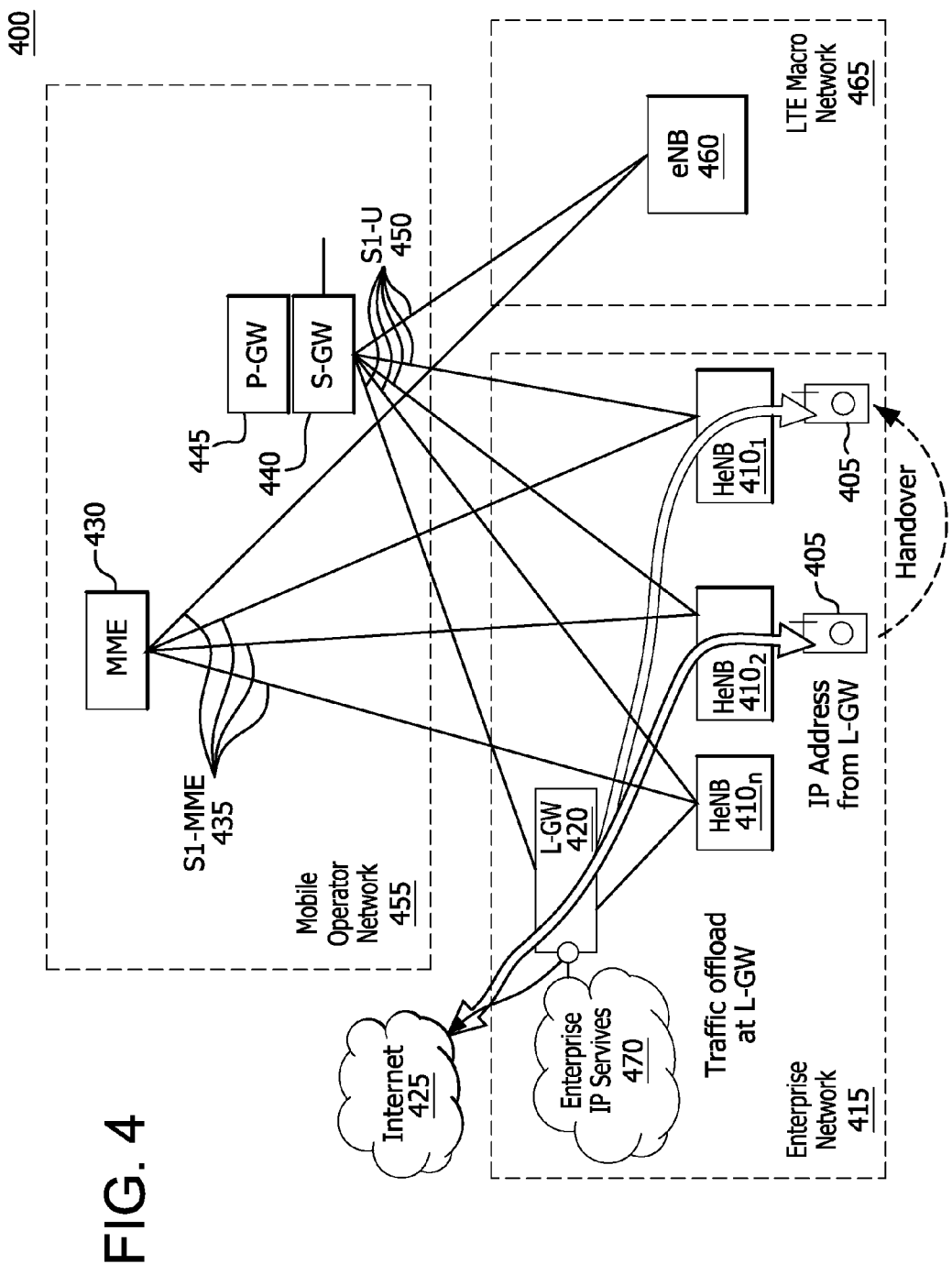
FIG. 4 shows an example of a wireless network configured to perform SIPTO or LIPA services.

FIG. 4 shows an example of a wireless network 400 configured to perform SIPTO or LIPA services. A WTRU 405 may communicate with one of a plurality of HeNBs $410_{1 \ldots n}$. The WTRU 405 and the plurality of HeNBs $410_{1 \ldots n}$ may be located at an Enterprise Network 415. An L-GW 420 is also located at the Enterprise Network 415. Each of the HeNBs $410_{1 \ldots n}$ may be in communication with the L-GW 420. The L-GW 420 may also be in communication with the Internet 425. Each of the HeNBs $410_{1 \ldots n}$ may be in communication with an MME 430 over an S1-MME interface 435. Each of the HeNBs $410_{1 \ldots n}$ may also be in communication with an S-GW 440 and a P-GW 445 over an S1-U interface 450. The S-GW 440 and the P-GW 445 may be collocated. The MME 430, the S-GW 440, and the P-GW 445 may be located at a Mobile Operator Network 455. An eNB 460 may be in communication with the MME 430 over an S1-MME interface 435 and may be in communication with the S-GW 440 and P-GW 445 over an S1-U interface 450. The eNB 460 may be located at an LTE Macro Network 465.

Traffic offload may be performed at the L-GW 420. In addition to being in communication with the Internet 425, the L-GW 420 may be in communication with Enterprise IP Services 470. The traffic offload may be performed from the WTRU 405 through the HeNBs $410_{1 \ldots n}$ and the L-GW 420 to the Internet 425. As shown in FIG. 4, the WTRU 405 may handover from one HeNB $410_2$ to another HeNB $410_1$ and may continue to perform traffic offload via the L-GW 420.

As shown in FIG. 4, a HeNB subsystem may support SIPTO to provide access from the WTRU 405 connected via a HeNB $410_{1 \ldots n}$ via HeNB radio access to a network, such as the Internet 425. SIPTO may be performed without traversing the Mobile Operator Network 455. A mobile operator or a HeNB hosting party may enable or disable SIPTO on a HeNB-by-HeNB basis. Based on SIPTO policies set by, for example, the mobile operator, the network may be able to allow a user of the WTRU 405 to accept or decline offload before traffic is offloaded. SIPTO policies may be defined per APN, per IP Flow class under any APN, or per IP Flow class under a specific APN. The mobile operator may configure the SIPTO policies either statically or dynamically.

As shown in FIG. 4, the WTRU 405, in communication with at least one HeNB $410_{1 \ldots n}$, may have a LIPA connection that provides an IP connection to the Enterprise IP Services 470. The WTRU 405 may also have a SIPTO connection that is offloaded at a RAN, via the L-GW 420, to the Internet 425. Thus, in FIG. 4, the L-GW 420 is at the RAN and is standalone. Therefore, in this example, SIPTO for use with the HeNB subsystem may be offloading IP traffic from the HeNB subsystem to the Internet. Thus, SIPTO service may be "closer" to the WTRU because it is available at the RAN. In other examples, traffic offload may be available beyond the RAN.

Figure 5:
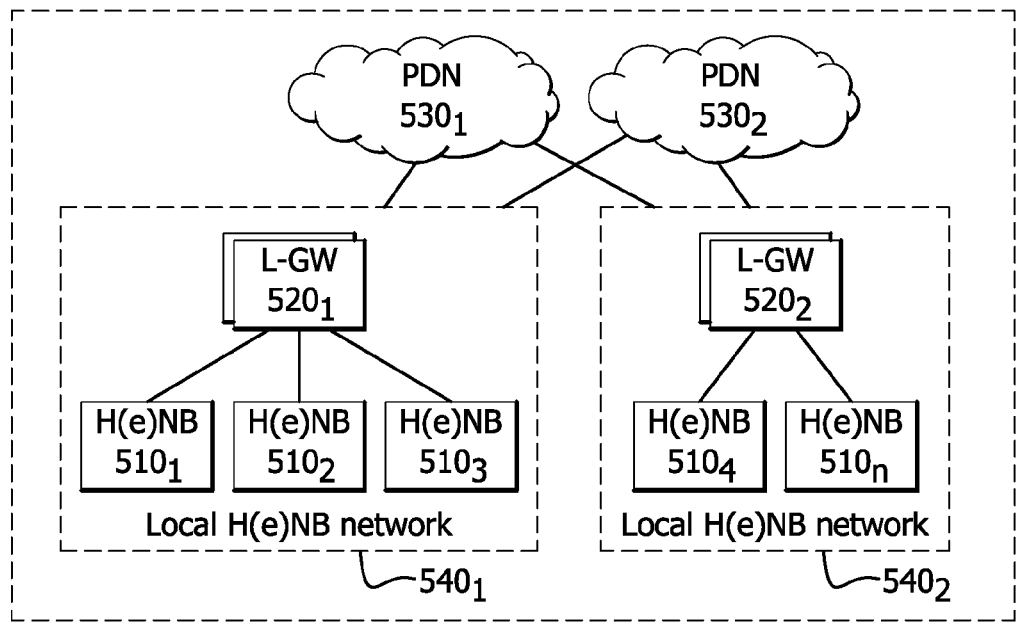
FIG. 5 shows an example of a wireless network that includes a plurality of Local H(e)NB Networks (LHNs)

FIG. 5 shows an example of a wireless network 500 that includes a plurality of Local H(e)NB Networks (LHNs). The wireless network 500 may be configured to perform SIPTO or LIPA services. FIG. 5 shows a plurality of H(e)NBs $510_{1-n}$, two L-GWs $520_{1-2}$, and two Packet Data Networks (PDNs) $530_{1-2}$. In the example shown in FIG. 5, the plurality of H(e)NBs $510_{1-n}$ and the two L-GWs $520_{1-2}$ comprise two LHNs $540_{1-2}$. As described above in detail, each of the L-GWs $520_{1-2}$ is not collocated with each of the H(e)NBs $510_{1-n}$, which may allow continuity of a PDN connection as a WTRU (not shown) moves between the coverage area of more than one of the H(e)NBs $510_{1-n}$. Thus, multiple H(e)NBs $510_{1-n}$ may connect to one of the L-GWs $520_{1-2}$. As an example, the wireless network 500 may allow a WTRU (not shown) with a SIPTO or LIPA PDN connection to move between any of the H(e)NBs $510_{1-n}$ (referred to, for example, as an H(e)NB subsystem) while maintaining the PDN connection with SIPTO or LIPA services. As shown in FIG. 5, each LHN $540_1$, $540_2$ may include one L-GW $520_1$, $520_2$, and each L-GW $520_1$, $520_2$ may be in communication with at least one of the H(e)NBs $510_{1-n}$. If a WTRU moves away from one of the LHNs $540_1$, $540_2$ (for example, the WTRU moves out of the coverage of all H(e)NBs $510_{1-3}$ that connect to one L-GW $520_1$), the PDN connection for SIPTO or LIPA services may be deactivated.

Figure 6:
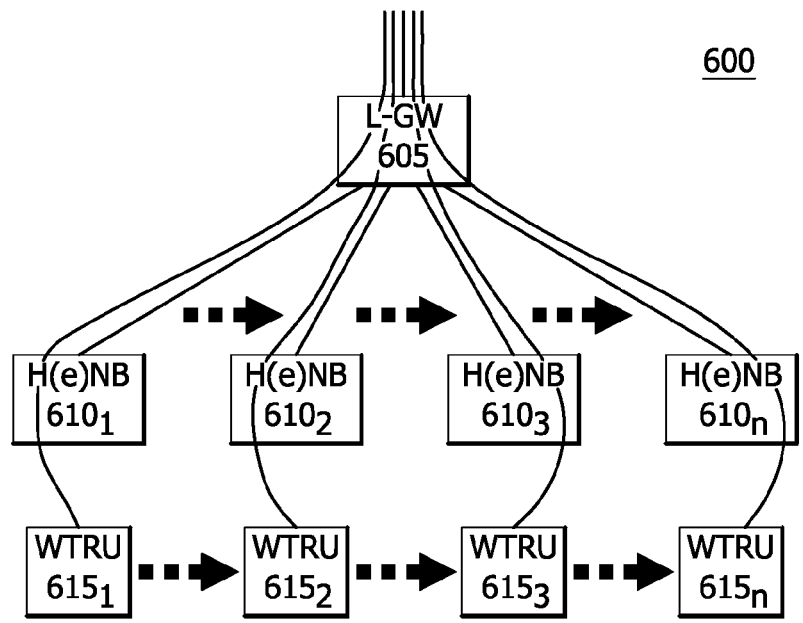
FIG. 6 shows an example of WTRU mobility among multiple H(e)NBs that connect to the same L-GW.

FIG. 6 shows an example 600 of WTRU mobility among one or more H(e)NBs that connect to the same L-GW. The L-GW 605 may be in communication with one or more H(e)NBs $610_{1-n}$. Each of the one or more H(e)NBs $610_{1-n}$ may be in communication with one or more WTRUs $615_{1-n}$. For example, at a particular time, a WTRU $615_1$ may be in communication with a first H(e)NB $610_1$. The WTRU $615_1$ may in communication with the L-GW 605 via the first H(e)NB $610_1$. The WTRU $615_1$ may be receiving services (including, for example, SIPTO and/or LIPA services) from the L-GW 605. The potential communication paths are shown in FIG. 6. The WTRU $615_1$ may disconnect from the first H(e)NB $610_1$ and may, at some point in time, connect to a second H(e)NB $610_2$ (shown as WTRU $615_2$). The WTRU $615_2$ may be in communication with the L-GW 605 via the second H(e)NB $610_2$. Because the second H(e)NB 6102 may be in communication with the L-GW 605, the WTRU $615_2$ may receive and/or resume services that the WTRU $615_2$ was previously receiving via the first H(e)NB 6101. The potential communication paths are shown in FIG. 6. The services may include SIPTO and/or LIPA services to allow for SIPTO and/or LIPA service continuity, for example, after a handover. The change in the communication paths based on mobility of the WTRU $615_2$ is also shown via for example, the arrows shown in FIG. 6. Similarly, the WTRU $615_2$ may handover to a third H(e)NB $610_3$ (shown as WTRU $615_3$) and may receive or resume services from the L-GW 605 via the third H(e)NB $610_3$. The WTRU $615_3$ may handover to a fourth H(e)NB $610_4$ (shown as WTRU $615_4$) and may receive or resume services from the L-GW 605 via the fourth H(e)NB $610_4$.

The examples and architecture shown in FIG. 6 are for purposes of example, and other combinations of nodes, devices, or handovers are possible. For example, a WTRU may receive services from one or more H(e)NBs at a particular time and may connect and/or disconnect from the H(e)NBs in any order at any time.

FIGS. 7-12 show examples of architectural structures for supporting an L-GW in a wireless network. an L-GW may be a standalone L-GW or a standalone L-GW located along an S1/Iu path. The examples shown in FIGS. 7-12 may be applicable to any technology, such as, for example but not limited to, LTE or UMTS systems or wireless networks.

Figure 7:
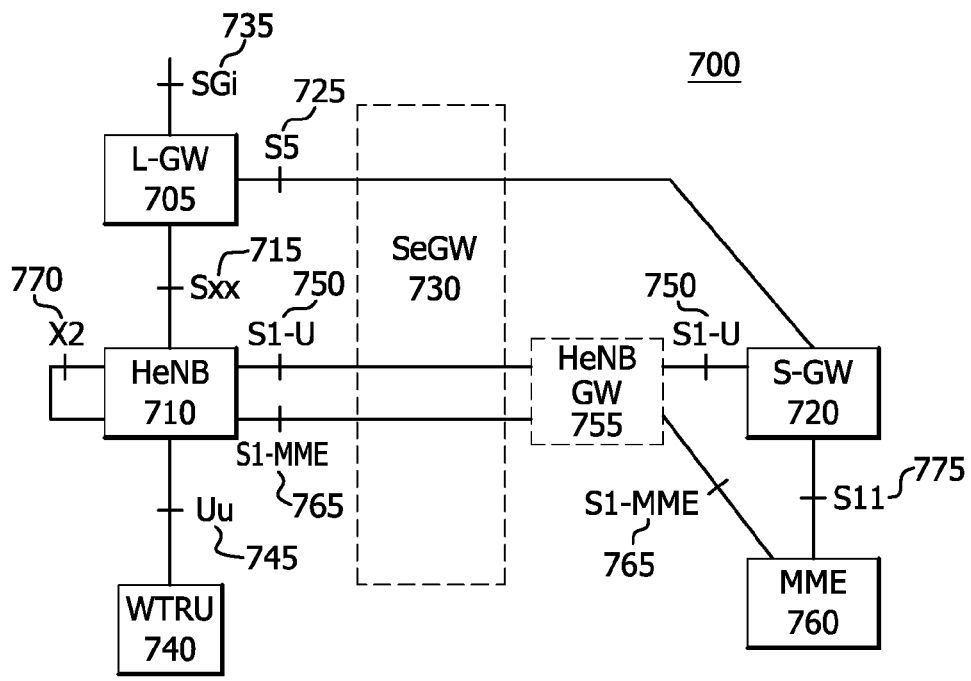
FIG. 7 shows an example wireless network with a standalone logical L-GW configured to provide SIPTO or LIPA services.

FIG. 7 shows an example wireless network 700 with a standalone logical L-GW configured to provide SIPTO or LIPA services. The L-GW 705 may be used, for example, as part of a HeNB subsystem. The L-GW 705 may be in communication with a HeNB 710 over an Sxx interface 715. The L-GW 705 may also be in communication with an S-GW 720 over an S5 interface 725. A SeGW 730 is shown between the L-GW 705 and the S-GW 720 and the SeGW 730 may maintain a secure connection between the L-GW 705 and the S-GW 720. The L-GW 705 may also communicate with any other node or device over an SGi interface 735.

The HeNB 710 may also be in communication with a WTRU 740 over a Uu interface 745. The HeNB 710 may be in communication with the S-GW 720 over an S1-U interface 750. The SeGW 730 is shown between the HeNB 710 and the S-GW 720 and may maintain a secure connection between the HeNB 710 and the S-GW 720. A HeNB-Gateway (HeNB-GW) 755 is also shown between the HeNB 710 and the S-GW 720 and may maintain a secure connection between the HeNB 710 and the S-GW 720. The HeNB 710 may be in communication with an MME 760 over an S1-MME interface 765. The SeGW 730 is shown between the HeNB 710 and the MME 760 and may maintain a secure connection between the HeNB 710 and the MME 760. The HeNB-GW 755 is also shown between the HeNB 710 and the MME 760 and may maintain a secure connection between the HeNB 710 and the MME 760. The HeNB 710 may also communicate with any other node or device over an X2 interface 770. The S-GW 720 and the MME 760 may be in communication over an S11 interface 775.

Figure 8:
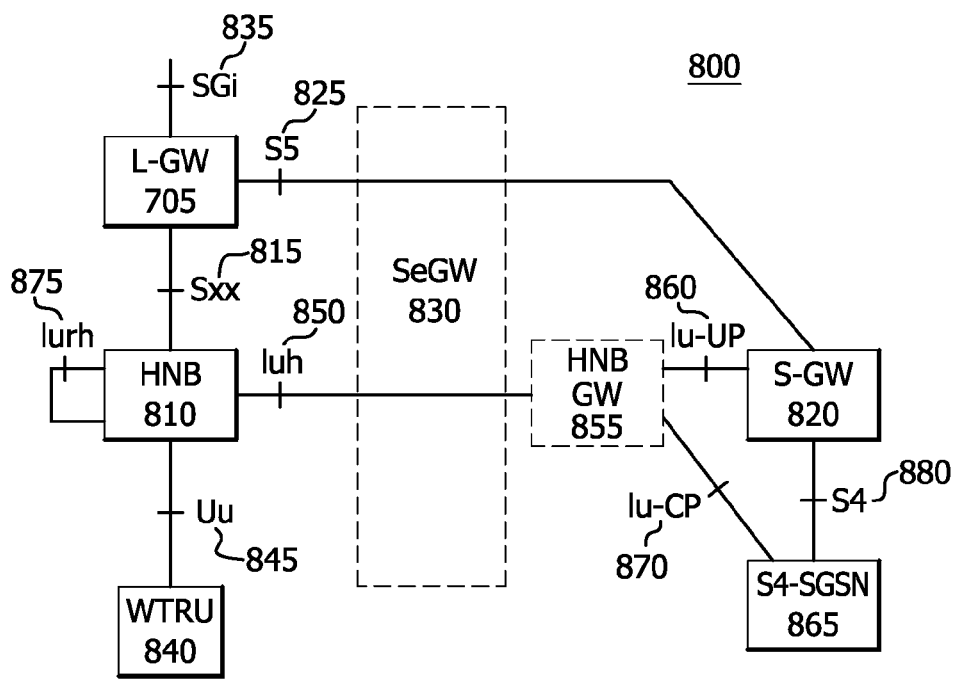
FIG. 8 shows an example wireless network with a standalone logical L-GW configured to provide SIPTO or LIPA services.

FIG. 8 shows an example wireless network 800 with a standalone logical L-GW configured to provide SIPTO or LIPA services. The L-GW 805 may be used, for example, as part of an HNB subsystem. The L-GW 805 may be in communication with an HNB 810 over an Sxx interface 815. The L-GW 805 may also be in communication with an S-GW 820 over an S5 interface 825. A SeGW 830 is shown between the L-GW 805 and the S-GW 820 and the SeGW 830 may maintain a secure connection between the L-GW 805 and the S-GW 820. The L-GW 805 may also communicate with any other node or device over an SGi interface 835.

The HNB 810 may also be in communication with a WTRU 840 over a Uu interface 845. The HNB 810 may be in communication with the S-GW 820. The SeGW 830 is shown between the HNB 810 and the S-GW 820 and may maintain a secure connection between the HNB 810 and the S-GW 820. An HNB-Gateway (HNB-GW) 855 is also shown between the HNB 810 and the S-GW 820 and may maintain a secure connection between the HNB 810 and the S-GW 820. The HNB 810 may communicate with the HNB-GW 855 over an Iuh interface 850. The HNB-GW 855 may communicate with the S-GW 820 over an Iu-UP interface 860. The HNB 810 may be in communication with an S4-SGSN 865. The SeGW 830 is shown between the HNB 810 and the S4-SGSN 865 and may maintain a secure connection between the HNB 810 and the S4-SGSN 865. The HNB-GW 855 is also shown between the HNB 810 and the S4-SGSN 865 and may maintain a secure connection between the HNB 810 and the S4-SGSN 865. As described above, the HNB 810 may communicate with the HNB-GW 855 over an Iuh interface 850. The HNB-GW 855 may communicate with the S4-SGSN 865 over an Iu-CP interface 870. The HNB 810 may also communicate with any other node or device over an Iurh interface 875. The S-GW 820 and the S4-SGSN 865 may be in communication over an S4 interface 880.

Figure 9:
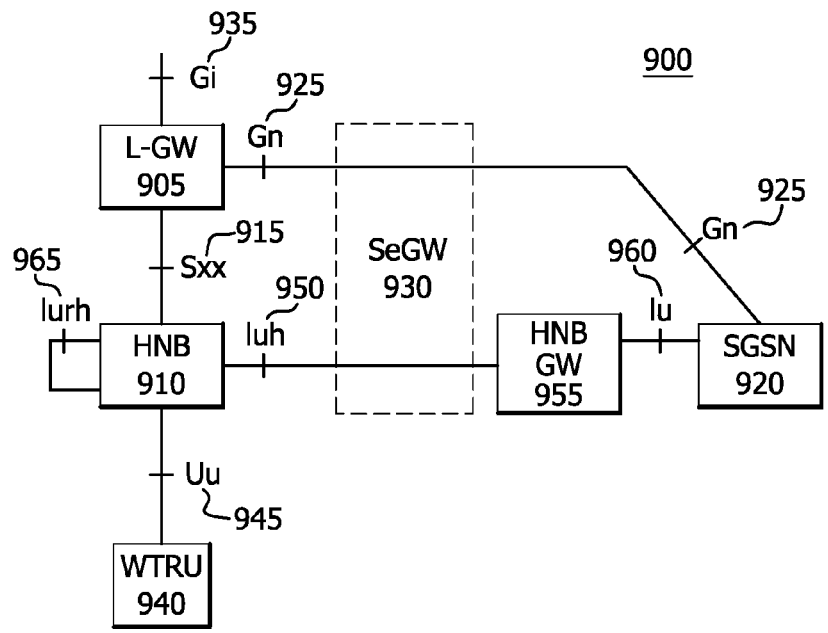
FIG. 9 shows an example wireless network with a standalone logical L-GW configured to provide SIPTO or LIPA services.

FIG. 9 shows an example wireless network 900 with a standalone logical L-GW configured to provide SIPTO or LIPA services. The L-GW 905 may be used, for example, as part of a UMTS system. The L-GW 905 may be in communication with an HNB 910 over an Sxx interface 915. The L-GW 905 may also be in communication with an SGSN 920 over a Gn interface 925. A SeGW 930 is shown between the L-GW 905 and the SGSN 920 and the SeGW 930 may maintain a secure connection between the L-GW 905 and the SGSN 920. The L-GW 905 may also communicate with any other node or device over a Gi interface 935.

The HNB 910 may also be in communication with a WTRU 940 over a Uu interface 945. The HNB 910 may be in communication with the SGSN 920. The SeGW 930 is shown between the HNB 910 and the SGSN 920 and may maintain a secure connection between the HNB 810 and the SGSN 920. An HNB-GW 955 is also shown between the HNB 910 and the SGSN 920 and may maintain a secure connection between the HNB 910 and the SGSN 920. The HNB 910 may communicate with the HNB-GW 955 over an Iuh interface 950. The HNB-GW 955 may communicate with the SGSN 920 over an Iu interface 960. The HNB 910 may also communicate with any other node or device over an Iurh interface 965.

Figure 10:
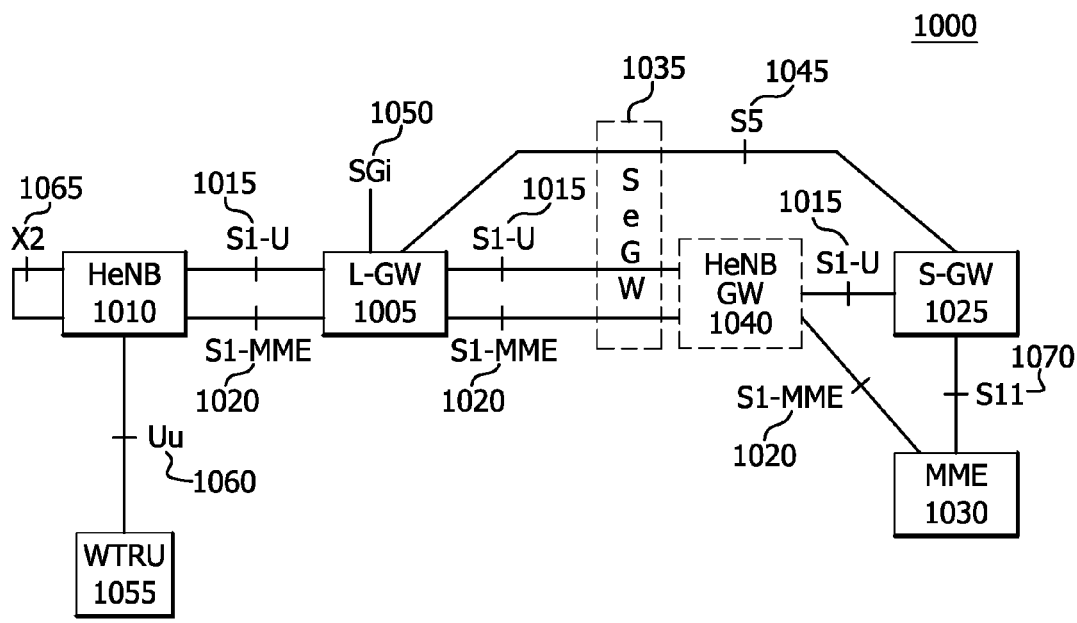
FIG. 10 shows an example wireless network configured to provide SIPTO or LIPA services with a standalone logical L-GW located along an S1/Iu path.

FIG. 10 shows an example wireless network 1000 configured to provide SIPTO or LIPA services with a standalone logical L-GW located along an S1/Iu path. The L-GW 1005 may be used, for example, as part of a HeNB subsystem. The L-GW 1005 may be in communication with a HeNB 1010 over an S1-U interface 1015 and/or an S1-MME interface 1020. Thus, the L-GW 1005 may be located in a path between the HeNB 1010 and an S-GW 1025 and an MME 1030. The L-GW 1005 may be in communication with the S-GW 1025 via the S1-U interface 1015 and in communication with the MME 1030 via the S1-MME interface 1020. A SeGW 1035 and a HeNB-GW 1040 are shown between the L-GW 1005 and the S-GW 1025, and the SeGW 1035 and HeNB-GW 1040 may maintain a secure connection between the L-GW 1005 and the S-GW 1025. The SeGW 1035 and the HeNB-GW 1040 are shown between the L-GW 1005 and the MME 1030, and the SeGW 1035 and HeNB-GW 1040 may maintain a secure connection between the L-GW 1005 and the MME 1030. The L-GW 1005 may also communicate with the S-GW 1025 over an S5 interface 1045. The SeGW 1035 may be between the L-GW 1005 and the S-GW 1025 over the S5 interface 1045. The L-GW 1005 may also communicate with any other node or device over an SGi interface 1050.

The HeNB 1010 may be in communication with a WTRU 1055 over a Uu interface 1060. The HeNB 1010 may also be in communication with any other node or device over an X2 interface 1065. The S-GW 1025 and the MME 1030 may be in communication over an S11 interface 1070.

Figure 11:
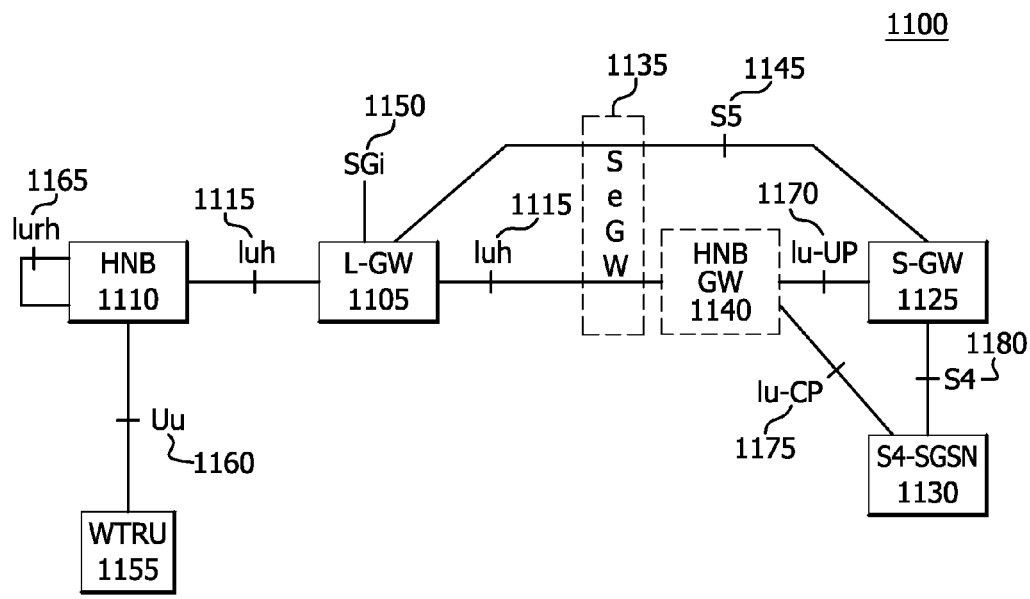
FIG. 11 shows an example wireless network configured to provide SIPTO or LIPA services with a standalone logical L-GW located along an S1/Iu path.

FIG. 11 shows an example wireless network 1100 configured to provide SIPTO or LIPA services with a standalone logical L-GW located along an S1/Iu path. The L-GW 1105 may be used, for example, as part of an HNB subsystem. The L-GW 1105 may be in communication with an HNB 1110 over an Iuh interface 1115. Thus, the L-GW 1105 may be located in a path between the HNB 1110 and an S-GW 1125 and an S4-SGSN 1130. A SeGW 1135 and an HNB-GW 1140 are shown between the L-GW 1105 and the S-GW 1125, and the SeGW 1135 and HNB-GW 1140 may maintain a secure connection between the L-GW 1105 and the S-GW 1125. The L-GW 1105 may communicate with the HNB-GW 1140 over the Iuh interface 1115. The SeGW 1135 and the HNB-GW 1140 are shown between the L-GW 1105 and the S4-SGSN 1130, and the SeGW 1135 and HNB-GW 1140 may maintain a secure connection between the L-GW 1105 and the S4-SGSN 1130. The L-GW 1105 may also communicate with the S-GW 1125 over an S5 interface 1145. The SeGW 1135 may be between the L-GW 1105 and the S-GW 1125 over the S5 interface 1145. The L-GW 1105 may also communicate with any other node or device over an SGi interface 1150.

The HNB 1110 may be in communication with a WTRU 1155 over a Uu interface 1160. The HNB 1110 may also be in communication with any other node or device over an Iurh interface 1165. The HNB-GW 1140 may communicate with the S-GW 1125 over an Iu-UP interface 1170. The HNB-GW 1140 may communicate with the S4-SGSN 1130 over an Iu-CP interface 1175. The S-GW 1125 and the S4-SGSN 1130 may be in communication over an S4 interface 1180.

Figure 12:
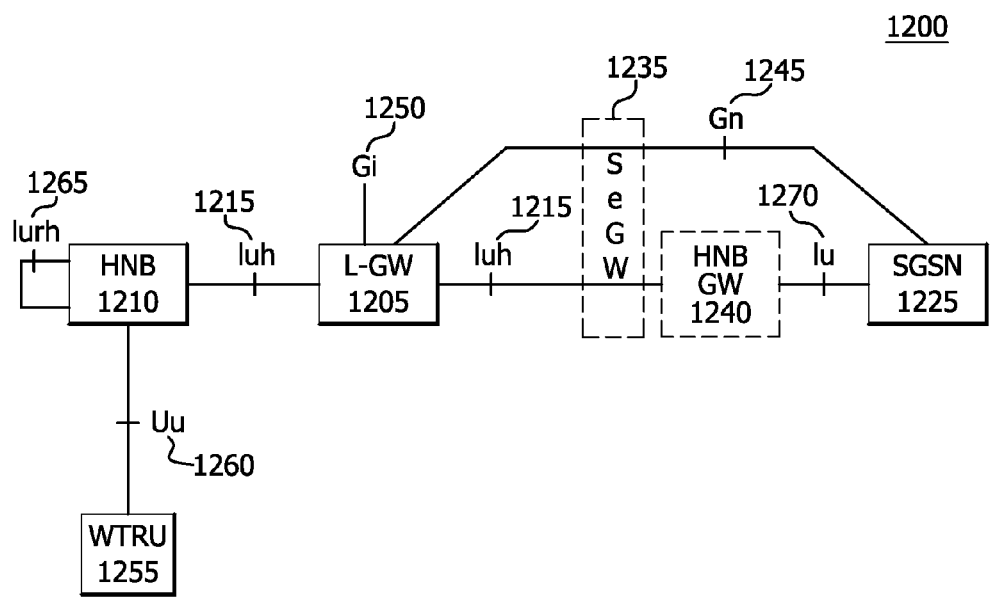
FIG. 12 shows an example wireless network configured to provide SIPTO or LIPA services with a standalone logical L-GW located along an S1/Iu path.

FIG. 12 shows an example wireless network 1200 configured to provide SIPTO or LIPA services with a standalone logical L-GW located along an S1/Iu path. The L-GW 1205 may be used, for example, as part of a UMTS HNB subsystem. The L-GW 1205 may be in communication with an HNB 1210 over an Iuh interface 1215. Thus, the L-GW 1205 may be located in a path between the HNB 1210 and an SGSN 1225. A SeGW 1235 and an HNB-GW 1240 are shown between the L-GW 1205 and the SGSN 1225, and the SeGW 1235 and HNB-GW 1240 may maintain a secure connection between the L-GW 1205 and the SGSN 1225. The L-GW 1205 may communicate with the HNB-GW 1240 over the Iuh interface 1215. The L-GW 1205 may also communicate with the SGSN 1225 over a Gn interface 1245. The SeGW 1235 may be between the L-GW 1205 and the SGSN 1225 over the Gn interface 1245. The L-GW 1205 may also communicate with any other node or device over a Gi interface 1250.

The HNB 1210 may be in communication with a WTRU 1255 over a Uu interface 1260. The HNB 1210 may also be in communication with any other node or device over an Iurh interface 1265. The HNB-GW 1240 may communicate with the SGSN 1225 over an Iu interface 1270.

One skilled in the art will recognize that the examples shown in FIGS. 7-12 are for exemplary purposes only. The nodes and elements shown (and the corresponding names) are for exemplary purposes and one skilled in the art will recognize that any node or interface capable of performing similar functions may be used. Further, the architectures shown are for purposes of example and other combinations of nodes and interfaces are possible.

In order to facilitate WTRU mobility and SIPTO/LIPA services based on the architecture described above, one or a combination of the following may be used. Initial system access, including cell search, attachment, and detachment, is described herein. A WTRU acquiring information about an L-GW and its Local Home eNB Network (LHN) to allow SIPTO and LIPA services is also described. Maintaining desired service continuity as a WTRU moves among HeNBs or out of the LHN is also described.

Methods and apparatus are described for improving identification and authorization of WTRUs and services with independent L-GWs and LHNs that support LIPA and SIPTO services. Further, methods for improving WTRU cell search and reselection are described. For example, a SIPTO and/or LIPA supporting-LHN may be identified by a WTRU. Rules and configuration details to allow a WTRU to locate and find an LHN access point to enable SIPTO and/or LIPA services are described. In addition, WTRU attach procedure details for network registration to the LHN and/or HeNB for LIPA and SIPTO are also described.

Methods and apparatus for identifying SIPTO and/or LIPA service continuity areas (SCAs) are described. For WTRUs moving between cells belonging to the same LHN and/or beyond the LHN, methods for service continuity for SIPTO and/or LIPA are provided. A WTRU (for example, a WTRU in Idle mode) may support the SIPTO/LIPA service continuity while the WTRU moves between cells and potentially between LHNs. In connected mode, for example, in an X2 handover case, the system may also determine whether the target cell may support the SIPTO/LIPA continuity before the handover is performed and before the core network (CN) initiates a path switch.

Resolutions to security issues associated with using an International Mobile Subscriber Identity (IMSI) or Mobile Subscriber ISDN Number (MSISDN) in a message are described. For example, the WTRU IMSI may be included in a CREATE SESSION REQUEST message to the L-GW from the MME if the WTRU has sent an ATTACH REQUEST to the MME. Since the L-GW may not be under direct control of the operator, the L-GW may need information related to the user. To protect the user's privacy and identity at the L-GW, WTRU-IDs such as, for example, the IMSI or the MSISDN may be protected or excluded from being included in the CREATE SESSION REQUEST message sent by the MME during the WTRU ATTACH procedure to enable SIPTO and/or LIPA services. Accordingly, methods are described for protecting user information at the L-GW.

A WTRU may reestablish or resume SIPTO and/or LIPA services after a Radio Link Failure (RLF). The WTRU may re-connect to another cell or HeNB and may re-establish the connection that existed between the old HeNB and the L-GW between the new HeNB and the L-GW.

Methods and apparatus for distinguishing and identifying the different reasons for an unsuccessful WTRU ATTACH REQUEST for SIPTO and/or LIPA to the MME are described. The MME may be in communication with the L-GW for admission details and the MME may provided a reason for an unsuccessful ATTACH procedure. For example, an L-GW in a LHN may accept a user's SIPTO request, but reject its LIPA request. Thus, special failure codes and/or cause/reason codes may be included in, for example, the Create Session Response Message. The L-GW may therefore be able to indicate the possible rejection that affected the WTRU ATTACH REQUEST outcome. Further, based on the type of rejection, the MME may use policies to handle the rejections and identify the rejection to the WTRU. LHN access permission rules are specified for WTRU handling such as, for example, updating any of the LHN Lists.

If a network wants to relocate the WTRU's bearer or the WTRU's current SIPTO bearers to an L-GW (for example, if the WTRU is not currently under an H(e)NB cell under the LHN/L-GW), the network may try to handover the WTRU to an H(e)NB within the LHN and then trigger a detach procedure and then a reattach procedure. A WTRU may not be able to select to the same cell for the re-attach procedure and WTRU may select to a cell that does not belong to the intended LHN. Methods and apparatus are described to avoid relocation failures and to allow network triggering of relocated SIPTO and/or LIPA services.

An H(e)NB may be connected to multiple LHNs or multiple L-GWs. This may occur in the case of RAN sharing or, for example, femto network sharing in public areas. It may also occur in the context of multiple carriers or multiple RATs with different carriers or RATs mapped to different LHNs. Another example is an enterprise scenario in which multiple groups of employees are in a meeting, but the groups belong to different LHNs. Methods and apparatus are described herein to allow basic access or specific service access to different LHNs through the same H(e)NB. The methods and apparatus may be applied during security and access privilege differentiation.

As an L-GW is powered up, the L-GW may inform the H(e)NB-GW that the L-GW is now available at a particular IP address and therefore may allow the HNB-GW to provide service and core network connectivity for the L-GW and possibly to the H(e)NBs connected to the L-GW. Also, since the L-GW is connected to multiple H(e)NBs, the L-GW may act as an H(e)NB aggregator. For example, if an L-GW goes down and then comes back up, the individual H(e)NB under the L-GW may re-register to the core network (via, for example, the H(e)NB-GW) or the L-GW may act as an aggregator and register its H(e)NBs toward the H(e)NB-GW.

The methods described below may apply to several system areas and/or procedures and the examples described herein are for exemplary purposes only. For example, the examples may relate to Radio Resource Control (RRC), Non-Access Stratum (NAS), or any other combination or layer. Further, the methods may be applied in combination with any other solution under any other system area.

A WTRU may be configured to find, search for, identify, or locate a LHN. To attach to a specific LHN, one or a combination of the following may be used. A LHN configuration may be broadcast or published. The WTRU may perform a LHN search. The LHN search may be a manual search. The WTRU may perform a LHN cell selection.

The WTRU may search for its LHN to support LIPA services. A network node or system may broadcast a LHN ID in a system information block (SIB) from one or more cells that are within the LHN. The WTRU may search for a LHN as an access point for its LIPA access and/or SIPTO offload point, for example, for charging or any other purpose. For example, LIPA-ALLOWED and/or SIPTO-ALLOWED flags may be added to an SIB. The flags may indicate, for example, LIPA and/or SIPTO capability of the Closed Subscriber Group (CSG) and/or LHN to member WTRUs. Hybrid cells that may support LIPA and SIPTO services for non-member WTRUs may broadcast a LIPA-ALLOWED-NONMEMBER and/or a SIPTO-ALLOWED-NONMEMBER flag in its SIB to indicate the LIPA and SIPTO capability of the CSG and/or LHN to non-member WTRUs attempting to access the hybrid cell. For example, these capability flags may be added to any message, for example SIB-1. Table 1 shows an example of a message that includes a LHN-id field, a SIPTO-ALLOWED field, a SIPTO-ALLOWED-NONMEMBER field, a LIPA-ALLOWED field, and a LIPA-ALLOWED-NONMEMBER field.

TABLE 1

```
SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                             ENUMERATED {barred, notBarred},
        intraFreqReselection                   ENUMERATED {allowed, notAllowed},
        csg-Indication                         BOOLEAN,
        csg-Identity                       CSG-Identity           OPTIONAL -- Need OR
    LHN-Id                             LHN-Identity       OPTIONAL
    SIPTO-ALLOWED                      ENUMERATED {allowed, notAllowed) OPTIONAL
    SIPTO-ALLOWED-NONMEMBER            ENUMERATED {allowed, notAllowed) OPTIONAL
    LIPA-ALLOWED                       ENUMERATED {allowed, notAllowed) OPTIONAL
    LIPA-ALLOWED-NONMEMBER             ENUMERATED {allowed, notAllowed) OPTIONAL
    },
    cellSelectionInfo                  SEQUENCE {
        q-RxLevMin                         Q-RxLevMin,
        q-RxLevMinOffset                   INTEGER (1..8)                 OPTIONAL -- Need OP
    },
    p-Max                              P-Max                      OPTIONAL,       -- Need OP
    freqBandIndicator                  INTEGER (1..64),
    schedulingInfoList                 SchedulingInfoList,
    tdd-Config                         TDD-Config                 OPTIONAL, -- Cond TDD
    si-WindowLength                    ENUMERATED {
                                           ms1, ms2, ms5, ms10, ms15, ms20,
                                           ms40},
    systemInfoValueTag                 INTEGER (0..31),
    nonCriticalExtension               SystemInformationBlockType1-v890-IEs        OPTIONAL
}
```

A CSG may include H(e)NBs belonging to different LHNs. Also, one LHN may span across multiple CSGs. A WTRU may search for a LHN for SIPTO or LIPA service based on a "LHN List" provided to and/or stored by the WTRU. A WTRU may only be allowed to use the SIPTO and/or LIPA services (and other derivative services) over the LHNs that have their LHN-Id included in this LHN list. The LHN List may be used to manage the list of allowed LHN IDs, Operator LHN IDs, and/or related restricted access information at a WTRU. This information may be stored, for example, in the WTRU's Universal Subscriber Identity Module (USIM) or in a non-volatile memory in the WTRU, as well as at the operator's core network in, for example, a Home Location Register (HLR)/Home Subscriber Server (HSS). A WTRU may receive a message and/or indication from a cell or H(e)NB that includes information related to a LHN. The message and/or indication may also include other information, such as for example, SIPTO/LIPA service information or identification information. The WTRU may compare any of the received information or indications with information stored in one or more LHN Lists stored at the WTRU. The WTRU may perform cell selection or reselection based on the comparison.

A WTRU may receive and/or maintain one or more CSG Lists. For example, a WTRU may maintain a CSG white list or Allowed CSG List that may include the CSG identities of CSGs that the WTRU belongs to or for which access has been granted to the WTRU. Any of the CSG Lists may include a list of allowed or previously visited CSGs or cells. CSG Lists may be received by a WTRU, for example, from upper layers or upon successful access to a CSG cell. One or more CSG Lists may be stored in the WTRU, for example in a USIM or a non-volatile memory. The WTRU may maintain and/or update the CST Lists. A WTRU may receive a message and/or indication from a cell or CSG that includes a CSG ID. The WTRU may compare the received CSG ID with CSG IDs included in one or more CSG Lists stored at the WTRU. The WTRU may perform cell selection or reselection based on the comparison. The CSG List may also include or comprise a HNB or H(e)NB List that includes a list of one or more HNBs or H(e)NBs.

An LHN List may include sublists. For example, sublists may include an "Allowed LHN List" and an "Operator's LHN List." As referred to herein, the phrase "LHN List" may include the Allowed LHN List and/or the Operator's LHN List as well as any other sublist within the LHN List. The LHN operator, an end user, and/or any operator may manage the Allowed LHN List. The Allowed LHN List may include, for example, LHN membership granted by the LHN operator and identified and/or verified by an end user. The Allowed LHN List may also include the Operator's LHN List. The Allowed LHN List may be used, for example, in a manual LHN search. The Operator's LHN list may be managed by the service operator. The Operator's LHN List may include, for example, the LHNs that a WTRU is allowed to access. The Operator's LHN List may be used, for example, for an automatic LHN search. Any of these lists may include additional lists or elements.

Figure 13:
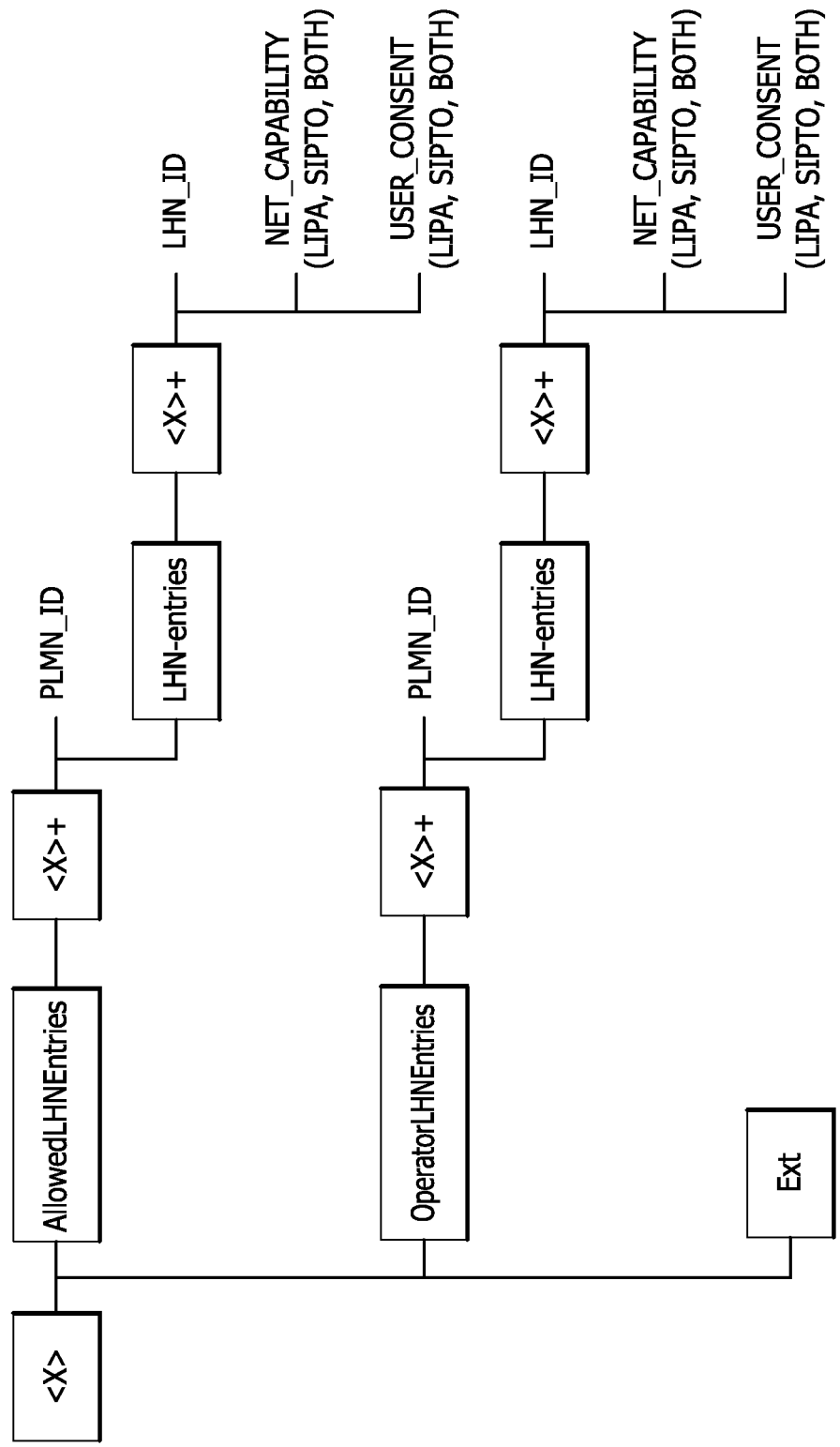
FIG. 13 shows an example an Allowed LHN List.

FIG. 13 shows an example of an LHN List object. The LHN List may be, for example, an LHN list with sublists such as the Allowed LHN List and the Operator's LHN List. Similarly, the LHN List may be any list or sublist described herein. The LHN List object shown in FIG. 13 may therefore also represent an Allowed LHN List. Referring to FIG. 13, AllowedLHNEntries may include a Public Land Mobile Network ID (PLMN_ID) and/or LHN-entries. The LHN-entries may include, but are not limited to, LHN_ID, NET_CAPABILITY, or USER_CONSENT. The NET_CAPABILITY element may indicate, for example, the LHN's capability to support SIPTO and/or LIPA service. Thus, the NET_CAPABILITY element may include values such as, for example, LIPA, SIPTO, or BOTH. The USER_CONSENT element may indicate, for example, user consent for SIPTO and/or LIPA service for a particular LHN. The USER_CONSENT element may include values such as, for example, LIPA, SIPTO, or BOTH. The USER_CONSENT element may also be defined, for example, per LHN, per APN, and/or per QoS. OperatorLHNEntries may include a PLMN_ID and/or LHN-entries. The LHN-entries may include, but are not limited to, LHN_ID, NET_CAPABILITY, or USER_CONSENT. The NET_CAPABILITY element may indicate, for example, the LHN's capability to support SIPTO and/or LIPA service. Thus, the NET_CAPABILITY element may include values such as, for example, LIPA, SIPTO, or BOTH. The USER_CONSENT element may indicate, for example, user consent for SIPTO and/or LIPA service for a particular LHN. The USER_CONSENT element may include values such as, for example, LIPA, SIPTO, or BOTH. The USER_CONSENT element may also be defined, for example, per LHN, per APN, and/or per QoS. Any extensions (shown by, for example, the "EXT" node) based on the nodes and leaf objects described herein are understood to be within the contents of this example. For example, the EXT node may include vendor-specific information. The EXT node may include one or more sublists or sub-trees. One skilled in the art will recognize that the names given are for purposes of example only.

If a WTRU receives an Allowed LHN List Management Object (MO) via, for example, the OMA DM Access including the Allowed LHN List, the WTRU may update its Allowed LHN List. The Allowed LHN List may be stored at the WTRU, for example, in a USIM or in a non-volatile memory in the WTRU, as described above. If a WTRU receives an Operator's LHN List Management Object (MO) via, for example, the OMA DM Access including the Operator LHN List, it may update the Operator LHN List stored in, for example, the USIM or non-volatile memory.

A combined manual LHN and CSG cell selection procedure may be performed. A WTRU may perform a manual LHN selection procedure, for example during power-up, a user-intervention, or any other programmed trigger, such as a WTRU entering a LHN proximity area. In a manual LHN selection procedure, a WTRU, with an indication from the NAS, may scan the available bands, find relevant or available cells, and/or indicate a list of available LHNs to the user along with, for example, associated CSG IDs and PLMNs. Selection criteria for available LHNs may be sent to the WTRU, for example, by an end user, via NAS signaling, or as defined in the USIM. The criteria may include one or a combination of the following. A LHN ID may be broadcasted by a suitable cell found by the WTRU. A LHN ID may be broadcasted by a suitable cell found by the WTRU, wherein the LHN ID is in one of the WTRU's LHN Lists, for example the Allowed LHN and/or the Operator LHN list. A LHN ID may broadcasted by a suitable cell found by the WTRU, wherein the LHN ID is in the WTRU's Operator LHN List. A LHN ID may be broadcasted by a suitable cell found by the WTRU, wherein the LHN ID is in the WTRU's LHN List and the cell is either a hybrid cell or a closed CSG cell whose CSG ID is included in the WTRU's CSG List, for example either the Allowed CSG or the Operator CSG list. A LHN ID may be broadcasted by a suitable cell found by the WTRU, wherein the LHN ID is included in the WTRU's Operator LHN List and the cell is either an hybrid cell or a closed CSG cell whose CSG ID is included in the WTRU's CSG list, for example the Allowed CSG or the Operator CSG list. A LHN ID may be broadcasted by a suitable cell found by the WTRU, wherein the LHN ID is included in the WTRU's Operator LHN List and the cell is either a hybrid cell or a private CSG cell whose CSG ID is included in, for example, the WTRU's Operator CSG List For each entry in any list, a WTRU may indicate to a user any or a combination of the following information. The WTRU may indicate the LHN ID. Alternatively or additionally, the WTRU may indicate the LHN group and/or whether or not the LHN is in the Operator LHN List or the Allowed LHN List. Alternatively or additionally, the WTRU may indicate the access cell type. The WTRU may indicate whether the cell is a hybrid cell for which the WTRU is not a member and/or whether the hybrid cell supports LHN access for non-members. The WTRU may indicate the WTRU is a member of a CSG cell. The WTRU may also indicate the CSG ID or the CSG ID group and/or whether the CSG cell is included in an Operator CSG List or an Allowed CSG List and/or whether the CSG cell is included in the CSG white list. Alternatively or additionally, the WTRU may indicate the SIPTO and/or LIPA capability of a cell.

A user may select a LHN from the indicated LHNs. If the WTRU has a PDN connection for emergency bearer services, manual LHN selection may not be performed. If the user makes a selection, the WTRU may attempt to camp on a cell with the selected LHN identity and may attempt to register from the cell to the associated PLMN.

Access Stratum (AS) layer action may be used to support LHN selection (for example, manual LHN selection). To support manual LHN selection, the AS layer of the WTRU, for example, on the request from the NAS, may scan some or all RF channels in the configured bands according to the WTRU's capabilities to find available LHN IDs. On each carrier, the WTRU may at least search for the strongest cell, read system information of the strongest cell, and/or report available LHN ID(s) together with the PLMN(s) and/or CSG ID to the NAS. The search for available LHN IDs may be stopped on request from the NAS.

A specific LHN search may also be supported in the AS layer of the WTRU. If the NAS provides a LHN ID and/or CSG ID(s) to the AS, the AS may search for an acceptable or a suitable cell belonging to the selected LHN ID and CSG ID(s) and may camp on or access that cell. If the NAS provides the LHN ID to the AS, the AS may search for an acceptable or suitable cell that broadcasts the selected LHN ID and/or belongs to a CSG group that is included in the WTRU's CSG white list. The WTRU may perform registration via the specific LHN cell.

If a user selects a LHN in a PLMN that is different from the Registered PLMN (RPLMN), one or a combination of the following may be performed. The WTRU may store a duplicate of the RPLMN and a duplicate of the current PLMN selection mode. The WTRU may enter into Manual mode for PLMN selection and may select the PLMN corresponding to the LHN. The WTRU may attempt to register on the selected LHN cell in the PLMN. If the registration fails or the WTRU is no longer within the coverage of the LHN, the WTRU may return to the stored duplicate PLMN selection mode and use the stored duplicate value of RPLMN for further action. If the registration succeeds, the WTRU may perform one or a combination of the following, depending on the cell that the WTRU camps on. If the camped cell is not included in the LHN list, the WTRU may add that cell or LHN to the Allowed LHN List. If the camped cell is not included in the CSG list, the WTRU may add the cell to the Allowed CSG list. If the registration fails, one or more of the following actions may be performed by the WTRU, for example, depending on the return code. If the return code indicates that LHN access is not allowed, the LHN ID may be removed from the Allowed LHN List. The LHN ID may be added to the Forbidden LHN List. If the return code indicates that the LHN is temporarily unavailable, the WTRU may wait for a configured or predetermined time before allowing a retry. LHNs in the Forbidden LHN List may also be indicated to the user upon a LHN manual selection process. LHNs may be removed from the list, for example, upon power off or during a successful manual selection and registration.

LHN cell reselection may also be performed. If a WTRU does not have a PDN connection to an L-GW that belongs to a LHN, the WTRU may follow any cell reselection procedure. For an IDLE mode WTRU that has or had a PDN connection to an L-GW belonging to a LHN, special idle mode cell reselection may be used to keep the SIPTO and/or LIPA PDN connection alive.

Cell selection from a LHN cell may be performed. If a WTRU has or had a PDN connection to an L-GW belonging to a LHN and/or the WTRU has camped on a suitable LHN cell (for example, the cell belongs to the LHN), and if the WTRU detects another LHN cell which ranks higher, the WTRU may reselect to the detected LHN cell. The WTRU may optionally not reselect to a non-LHN cell regardless of the rank of the cell. Alternatively or additionally, to reduce interference, the targeted LHN cell may need to be the highest ranked LHN cell on that frequency to be considered for reselection. If the radio condition of the cell that WTRU is camped on is lost or deteriorated, and if WTRU cannot find a suitable LHN cell, the WTRU may reselect to any suitable LHN cell. After the WTRU camps on the non-LHN cell, the WTRU may maintain its local PDN connection (for example, the PDN connection to the LHN) to allow the WTRU to go back to a LHN cell. The WTRU may supply the L-GW information (for example, L-GW@LN, L-GW@CN, or correlation-Id) via the new cell, for example, to allow the supporting network to reroute the WTRU's connectivity and/or traffic to the original L-GW.

Cell selection may be performed from a non-LHN cell. If a WTRU has had a PDN connection to an L-GW belonging to a LHN and/or if the WTRU is currently camped on a cell that does not belong to the LHN, the WTRU may use an autonomous search function to detect LHN cells. The LHN cells may include at least those allowed LHN cells that the WTRU has previously visited on serving or non-serving frequencies, including, for example, inter-RAT frequencies. Any of the above may be performed alone or in combination with normal cell reselection.

If the WTRU has detected one or more suitable LHN cells on different frequencies, then the WTRU may reselect to one of the detected cells based on the ranking of those cells and/or LHN ID property. This may be performed, for example, irrespective of the frequency priority of the cell the WTRU is currently camped on. If the WTRU has detected a suitable LHN cell on the same frequency, the WTRU may reselect to that cell. Alternatively or additionally, the targeted LHN cell may be considered the highest ranked cell on that frequency. For example, this may reduce interference.

LHN cell selection and/or reselection may be triggered by an event. If a WTRU is paged from a LHN and the WTRU is currently camped on a non-LHN cell or a different LHN cell, the network may trigger the WTRU to search and reselect to a cell belonging to a LHN. The network may also trigger the WTRU to search and reselect to a cell belong to a LHN on behalf of a remote application or based on SIPTO needs. The network may use, for example, a NAS or RRC message to inform the WTRU of the LHN and/or the CSG group that the network wants the WTRU to camp on or connect to. If the WTRU receives the network message, the WTRU may release its RRC connection and select or reselect to a cell according to network's request. Optionally, certain events from the WTRU may also trigger a LHN cell selection or reselection. This may include, for example, a user's desire to do a local printing or any other local task.

A user preference may be defined and indicated by the WTRU. For example, if a WTRU is camped on a LHN cell, it may indicate to the network a preference for using LHN as its access point, for example, to the internet and/or its preference to access the LHN during an attach procedure or for a PDN connectivity procedure. A user preference may be indicated, for example, in an ESM INFORMATION RESPONSE message. A WTRU may include, for example, a LHN ID in the ESM INFORMATION RESPONSE if the user prefers to access a LHN network or access the APN via the LHN. The WTRU may indicate its preference for a LIPA service by setting the LHN ID and the APN to be the LHN's APN. If the WTRU prefers offloading its traffic on the LHN, it may set the LHN ID to the LHN that the WTRU prefers to use for offloading and may set the APN to the traffic that it would like to offload. Table 2 shows an example of an ESM INFORMATION RESPONSE that includes a LHN Identity information element.

TABLE 2

ESM INFORMATION RESPONSE message content

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | ESM information response message identity | Message type 9.8 | M | V | 1 |
| 28 | Access point name | Access point name 9.9.4.1 | O | TLV | 3-102 |
| 27 | Protocol configuration options | Protocol configuration options 9.9.4.11 | O | TLV | 3-253 |
|  | LHN Identity | LHN-ID | O |  |  |

Alternatively or additionally, a user preference may be indicated in a PDN CONNECTIVITY REQUEST message. If a user prefers to have a PDN connection to a LHN, the APN may be set to the APN of the LHN and the LHN-Identity may be set to LHN-ID. If the user prefers to establish a new PDN connection and prefers the new PDN connection to be offloaded via the LHN, the APN may be set to the APN the user prefers to establish the PDN connection with and/or the LHN-identity may be set to the LHN-ID of the preferred offload point. Table 3 shows an example of a PDN CONNECTIVITY REQUEST message that includes a LHN Identity information element.

TABLE 3

PDN CONNECTIVITY REQUEST message content

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | PDN connectivity request message identity | Message type 9.8 | M | V | 1 |

TABLE 3-continued

PDN CONNECTIVITY REQUEST message content

| IEI | Information Element | Type/Reference | Presence | Format | Length |
|---|---|---|---|---|---|
| | Request type | Request type 9.9.4.14 | M | V | ½ |
| | PDN type | PDN type 9.9.4.10 | M | V | ½ |
| D- | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |
| | LHN Identity | LHN-ID | O | | |

A user's network preference may also be included in an ATTACH REQUEST. If the LHN-ID is present in the ATTACH REQUEST message, the network may establish the default PDN connection via an L-GW of the specified LHN. Table 4 shows an example of an ATTACH REQUEST message that includes a LHN Identity information element.

The information element "Local Home Network" may be in the form of a LHN-Identifier or in any other form. If one H(e)NB may only belong to one LHN, the LHN-ID may be implicitly specified if a WTRU indicates a preference for SIPTO service. A WTRU may also include a Preferred_SIPTO_Point in a PDN CONNECTIVITY REQUEST message for a new PDN connection. Alternatively or additionally, a Preferred_SIPTO_Point may be included in an ATTACH COMPLETE message. The LHN-ID for the local home network for which the WTRU is requesting connectivity may be added to an ATTACH REQUEST message or a PDN CONNECTIVITY REQUEST message sent, for example, with the ATTACH REQUEST. The LHN-ID may be included as an information element.

SIPTO and/or LIPA service continuity may be supported. The SIPTO/LIPA service continuity may be supported outside the LHN cells in the Service Continuity Area (SCA). Providing WTRUs and/or the network with SIPTO/LIPA service continuity information and where it may be maintained may help make the cell reselection and/or handover decisions in idle mode and/or in connected mode, respectively. The Service Continuity Area may be defined by one or more of the following items in any combination. For

TABLE 4

ATTACH REQUEST message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type 9.9.3.11 | M | V | ½ |
| | NAS key set identifier | NAS key set identifier 9.9.3.21 | M | V | ½ |
| | EPS mobile identity | EPS mobile identity 9.9.3.12 | M | LV | 5-12 |
| | UE network capability | UE network capability 9.9.3.34 | M | LV | 3-14 |
| | ESM message container | ESM message container 9.9.3.15 | M | LV-E | 5-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| D- | Device properties | Device properties 9.9.2.0A | O | TV | 1 |
| | LHN-Identity | LHN-ID | O | | | example, the SCA may be defined as a list of cell IDs, a list of CSG IDs, a list of area IDs, such as, for example, Tracking Area Identities (TAIs), and/or a list of PLMN IDs. A WTRU may acquire the SCA either by reading a system information broadcast or by being informed via messages, such as for example, dedicated RRC messages or NAS messages. Alternatively or additionally, the SCA information provided to a WTRU may include information related to only nearby relevant neighboring cells within the reach of a WTRU for cell reselection or a handover measurement scan range, either adjacent or close to the current cell. This may con-server signaling space. To maintain SIPTO/LIPA service continuity, WTRUs in Idle mode may use the SCA information to facilitate the cell reselection. Alternatively or additionally, WTRUs in connected mode may use the SCA information for mobility measurements.

SIPTO/LIPA service continuity may be maintained in Idle mode. A WTRU that does not have a PDN connection to an L-GW belonging to a LHN may follow normal cell reselection procedures. An IDLE mode WTRU that has had a PDN connection to an L-GW belonging to a LHN may use special idle mode cell reselection to keep the SIPTO/LIPA PDN connection alive.

Cell selection may be performed from a cell in the SCA. If a WTRU has had a PDN connection to an L-GW belonging to a LHN and/or the WTRU is camped on a suitable SCA cell (for example, the cell supports SIPTO/LIPA service continuity to the LHN) and/or if the WTRU detects another SCA cell that ranks higher than the current cell, the WTRU may reselect to the detected SCA cell. The WTRU may not reselect to a non-SCA cell regardless of how highly that cell is ranked. Alternatively or additionally, reselection candidacy may include a rule such that the targeted SCA cell may need to be the highest ranked cell on that frequency. This may reduce interference. If the radio condition of the cell that the WTRU is camped on is lost or deteriorated and/or if the WTRU cannot find a suitable SCA cell, the WTRU may reselect to any suitable cell. If the WTRU camps on the non-SCA cell, the WTRU may maintain its local PDN connection (for example, a PDN connection to the LHN). This may allow the WTRU to go back to SCA coverage. Alternatively or additionally, the WTRU may supply the L-GW information (for example, L-GW@LN, L-GW@CN, or correlation-Id) via the new cell to allow the network to reroute the WTRU's connectivity and/or traffic to the original L-GW.

Cell selection may be performed from a cell outside the SCA. For example, if a WTRU has had a PDN connection to an L-GW belonging to a LHN and if the WTRU is currently camped on a cell that is not in SCA coverage, the WTRU may use an autonomous search function to detect at least previously visited and/or allowed SCA cells on serving or non-serving frequencies, which may include inter-RAT frequencies. This may be performed alternatively or in addition to normal cell reselection.

If the WTRU has detected one or more suitable SCA cells on different frequencies, the WTRU may reselect to one of the detected cells irrespective of the frequency priority of the cell that the WTRU is currently camped on. To reduce interference, further restriction may be used if the concerned LHN cell is the highest ranked cell on that frequency. If the WTRU detects a suitable SCA cell on the same frequency, it shall reselect to this cell. To reduce interference, further restriction may be applied if the concerned SCA cell is the higher ranked cell than the current cell on that frequency.

WTRU-requested LHN PDN Connectivity may be performed without using an IMSI and/or MSISDN. To protect user privacy, if a WTRU requests LHN PDN Connectivity, the MME/Network may not include the WTRU's IMSI or MSISDN in the corresponding message (for example, a CREATE SESSION REQUEST message) sent to the L-GW of the requested LHN. The MME may request a temporary IMSI (T_IMSI) and/or a temporary MSISDN (T_MSISDN) from a HSS and may use the $T\_IMS_1$ and T_MSISDN in the message for creating PDN connectivity with an L-GW. The HSS may store the T_IMSI and/or T_MSISDN. The stored T_IMSI and/or T_MSISDN may be released if the LHN PDN Connectivity is released.

Connectivity may be restored between the new HeNB and the L-GW after radio link failure (RLF). A WTRU may acquire the L-GW's correlation ID, which may include, for example, the L-GW@CN, the L-GW@LN, and/or Tunnel Endpoint Identifiers (TEIDs), during an attach procedure. This may be acquired via, for example, the ATTACH ACCEPT message if the WTRU attached to an L-GW. The L-GW's correlation ID may also be acquired during the PDN CONNECTIVITY REQUEST procedure, via for example, a PDN Connectivity Accept message if the WTRU activates a PDN connection at L-GW. During a NAS signaling connection recovery procedure, a WTRU may provide the L-GW's correlation ID (and optionally the L-GW@CN) to the serving eNB and the serving eNB may restore the S-XX interface towards the L-GW without going through the Core Network.

A WTRU may want to register to the network via an ATTACH REQUEST with SIPTO and/or LIPA capabilities enabled with the support of other CN PLMN services. The WTRU may be interested in the LHN services, but perhaps not any PLMN services (for example, the location services or MBMS services) except for control plane signaling. The WTRU may transmit an ATTACH REQUEST to the network with a type indicating, for example, "LHN Service only" and the LHN-ID of the LHN.

A WTRU's ATTACH REQUEST for LHN access may be rejected by the network for various reasons. A rejection may be caused by the user's related subscription or may be related in the MME/L-GW interaction process if the L-GW fails to honor the MME request due to, for example, local security issues. This may include scenarios in which the L-GW may have certain autonomous operational restrictions to WTRUs or to a particular WTRU. This may include, for example, a downgraded access privilege level. The L-GW rejection or grant with restriction may result in an MME response (such as an ATTACH REJECT) to the WTRU ATTACH REQUEST. The non-successful ATTACH results may be indicated to the WTRU in the return code, for example, by indicating "Access to the L-GW denied," "Access to the L-GW expired," "L-GW is temporarily unavailable," or the like. In the case of access denial or expiration, the LHN-Id may need to be removed from the Allowed LHN List. If the L-GW is unavailable, the WTRU may refrain from accessing the same L-GW for a configured/predetermined time period.

A SIPTO/LIPA-connected WTRU may require a minimum level of service integrity. If there is an active local access, for example a LIPA service, that is ongoing and a WTRU-initiated detach is started, the Detach procedure may need to wait (for example, with a timer) for the completion of the ongoing local access. If the timer expires, the user of the WTRU may be alerted and may be prompted to wait or stop the local access and continue the Detach procedure. The MME may Detach and re-attach the WTRU if one or more of the following conditions are true. The MME may Detach and re-attach if the L-GW is out of service and the WTRU has attached to both PLMN and LIPA services. In this example, the MME may re-attach the WTRU to a P-GW for PLMN service until the L-GW is recovered. Alternatively or additionally, the MME may detach and re-attach the WTRU to the L-GW if the L-GW is recovered.

The network may trigger SIPTO and/or LIPA with a detach/reattach procedure. To support network-triggered SIPTO or LIPA bearer relocation from a core network to a LHN and/or L-GW, an indication may be included in a DETACH REQUEST message. If the detach type is, for example, "re-attach required," the network may specify a "Reattach Target." The Reattach Target may be one or more of the following: the current cell; a cell ID; a group of Cell IDs; a LHN ID; a CSG ID; and/or a group of CSG IDs. Table 5 shows an example of a DETACH REQUEST message that includes a Reattach Target information element.

TABLE 5

Table DETACH REQUEST message content

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Detach request message identity | Message type 9.8 | M | V | 1 |
| | Detach type | Detach type 9.9.3.7 | M | V | ½ |
| | Spare half octet | Spare half octet 9.9.2.9 | M | V | ½ |
| 53 | EMM cause | EMM cause 9.9.3.9 | O | TV | 2 |
| | Reattach Target | | | | |

If a WTRU receives a DETACH REQUEST with a detach type of re-attach required that includes the Reattach Target IE, the WTRU may attempt to search for cell(s) whose identity or identities are indicated in the Reattach Target IE. The WTRU may perform a (re)attach procedure after the WTRU has selected a cell belonging to the Reattach Target.

RAN sharing and EPLMN support may be provided with LHNs. In one example, traffic and signaling from multiple LHNs or L-GWs may be transmitted or received through a common cell. In another example, a cell may broadcast a list of supported LHN IDs. If multiple LHNs are broadcasting information, additional flags may be provided in, for example, SIB1 as described above. The flags may be in the form of a list and the number of entries may match the number of supported LHNs. For example, if a WTRU selects a cell and initiates a connection (for example, at the RRC level or NAS level) toward the network, the WTRU may indicate to the network the selected LHN ID or any other LHN and/or L-GW related attribute to help the network correlate the WTRU to the LHN or the L-GW. In another example, the H(e)NB may store the LHN ID as part of the WTRU context information and may use this information to correctly route signaling related to this WTRU to the appropriate LHN or L-GW. This may be performed upon reception of, for example, the RRC CONNECTION REQUEST message or any other equivalent message. The H(e)NB may use the LHN information stored in the WTRU context to identify the correct LHN or L-GW for which to establish the bearers for the WTRU.

In another example, the WTRU may use the LHN ID or any other attribute or related flag to indicate the WTRU's preference or need to establish a SIPTO and/or LIPA connection, or to switch the existing PDN connections (for example, a SIPTO PDN connection) to the L-GW. These may be performed upon detection of a LHN or L-GW that the WTRU belongs to. In another example, the WTRU may report its LHN Identification or any other related information upon configuration of the network. Alternatively or additionally, the WTRU may autonomously report the LHN Identification or any other related information.

In another example, the WTRU may perform access control taking into account the LHN membership and/or the CSG membership. In one example, the WTRU is a member and may access the cell if the WTRU is a member of the CSG and the LHN, meaning that the WTRU has this LHN associated with the CSG in the WTRU's white list. In another example, the WTRU may be a member and may access the cell if the WTRU has the association of the CSG, the PLMN (or equivalent PLMN), and/or the LHN in the WTRU's white list. The operator may have control over the list of the PLMNs in the white list and the associated CSGs. The host party may have control over the associated LHNs. The LHN list may be uploaded to the operator as part of the LHN or L-GW registration procedure. In another example, access to SIPTO/LIPA may be controlled at the WTRU or the network based on the cell's CSG ID, one or several of the broadcasted LHN IDs, or the broadcasted PLMN ID being on the WTRU's white list.

The examples described above, while presented under the scenario of RAN sharing or femto network sharing by multiple LHNs or L-GWs are not to be limited to only such scenarios and are applicable to any other example or embodiment described herein and for use with any other SIPTO or LIPA service.

L-GW registration and/or multi-H(e)NB registration may be performed. As the L-GW is powered up, there may be a need for the L-GW to inform the H(e)NB-GW that the L-GW is now available at a particular IP address. The L-GW may also need to enable the HNB-GW to provide service and core network connectivity for the L-GW and possibly to the H(e)NBs connected to the L-GW. Because the L-GW may be connected to multiple H(e)NBs, the L-GW may act as an H(e)NB aggregator in some instances. For example, if an L-GW shuts down and then is powered up or turned on, the individual H(e)NB under the L-GW may need to be re-registered to the core network (via for example the H(e)NB-GW) or the L-GW may act as an aggregator and register its H(e)NB with the H(e)NB-GW. Each H(e)NB may maintain an individual Iuh connection with the H(e)NB-GW or Iuh aggregation may occur between the L-GW and the H(e)NB-GW.

The L-GW Registration Procedure may allow the L-GW to register with the H(e)NB-GW or another node in the core network such as, for example, the MME, the S-GW, or the SGSN. This may enable the H(e)NB-GW to provide service and core network connectivity for the HNB. If supported and configured, this may also enable Iurh connectivity via the H(e)NB-GW. This procedure may be triggered after the Iuh, Sxx, or S1 signaling transport has been successfully established and may optionally be the first procedure triggered after establishment. For Iuh, Sxx, or S1 signaling transport, there may be one signaling transport instance between the L-GW and the core network in support of all attached H(e)NBs. In another example, there may be a one-to-one mapping between the signaling transport bearer from any given H(e)NB to the L-GW, and from the L-GW to the core network (for example, the H(e)NB-GW).

Figure 14:
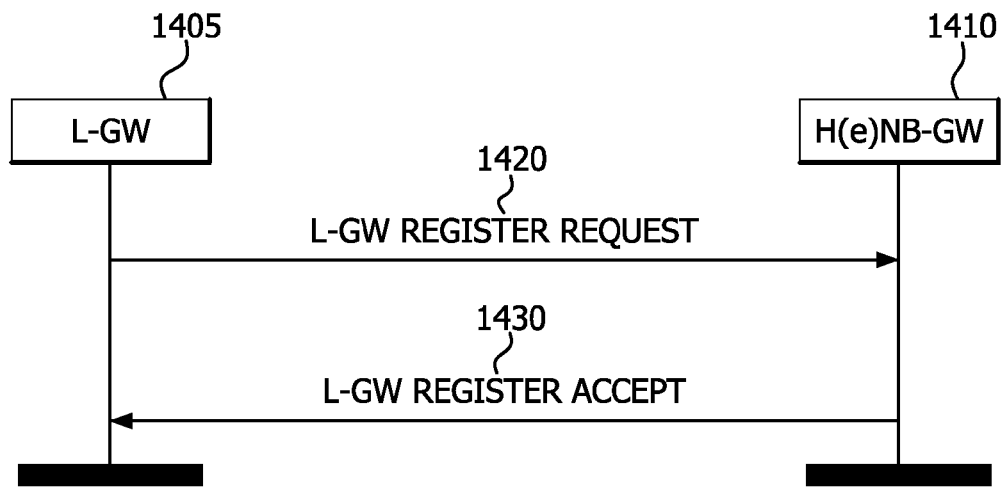
FIG. 14 shows an example call-flow diagram for a successful L-GW register procedure.

FIG. 14 shows an example call-flow diagram 1400 for a successful L-GW register procedure. An L-GW 1405 and an H(e)NB-GW 1410 are shown, although any other nodes or elements may be used in the procedure. The L-GW 1405 may send an L-GW REGISTER REQUEST 1420 to the H(e)NB-GW 1410. The L-GW REGISTER REQUEST 1420 may be sent by the L-GW 1405 if the L-GW 1405 needs to commence operations and/or requires service from a core network (not shown) via, for example, the H(e)NB-GW 1410. The L-GW 1405 may provide its LHN ID and/or transport layer address during the registration process and the LHN ID and/or transport layer address may be included in the L-GW REGISTER REQUEST 1420. The L-GW 1405 may provide a capability, such as for example, support for SIPTO and/or LIPA services, or any restrictions with respect to SIPTO and/or LIPA services. The L-GW 1405 may include any capability information in the L-GW REGISTER REQUEST 1420.

An HNB (not shown) may provide a list of attached H(e)NBs and/or the operational parameters included in an HNB REGISTRATION REQUEST message. As described in the examples for FIGS. 14-17, an HNB REGISTRATION REQUEST may be used instead of or in addition to an L-GW REGISTER REQUEST. An HNB and/or an L-GW may register with a core network and/or HNB-GW to provide services to a WTRU within the HNB and/or L-GW. For example, an HNB may register directly with the core network/HNB-GW and/or the L-GW may register one or more HNBs. Thus, the L-GW may include any features of the HNB REGISTER REQUEST in the L-GW REGISTER REQUEST or any other L-GW message described herein, and vice versa. If the L-GW 1405 supports direct interface relocation to other L-GWs (not shown), the L-GW 1405 may provide the direct interface signaling Transport Network Layer (TNL) Address IE to the core network (via H(e)NB-GW 1410) in, for example, the L-GW REGISTER REQUEST 1420.

If the registration is successful, the core network (via H(e)NB-GW 1410) may respond by transmitting an L-GW REGISTER ACCEPT 1430 message. The L-GW REGISTER ACCEPT 1430 message may indicate acceptance and registration. The acceptance and/or registration may include configurations for SIPTO and/or LIPA support. If a list of attached H(e)NBs is included in the L-GW REGISTER ACCEPT 1430 message (or, for example, an HNB REGISTRATION REQUEST message), the core network may indicate the registration result (for example, accept or reject) for each of the attached H(e)NBs in the L-GW REGISTER REQUEST 1420 message. If the direct interface signaling TNL Address IE is included in the L-GW REGISTER ACCEPT 1430 message, the L-GW 1405 may, if supported, establish a transport layer session to the indicated address to support direct connectivity via the H(e)NB-GW 1410. If the H(e)NB-GW 1410 is capable of de-multiplexing, then a MuxPortNumber IE may be included in the L-GW REGISTER ACCEPT 1430 message.

One skilled in the art will recognize that the messages described above with respect to FIG. 14 may be any type of message and the information included in each of the messages may be included in any type of message. Similarly, the messages may be transmitted in any order and not only in the order described in the example above.

Figure 15:
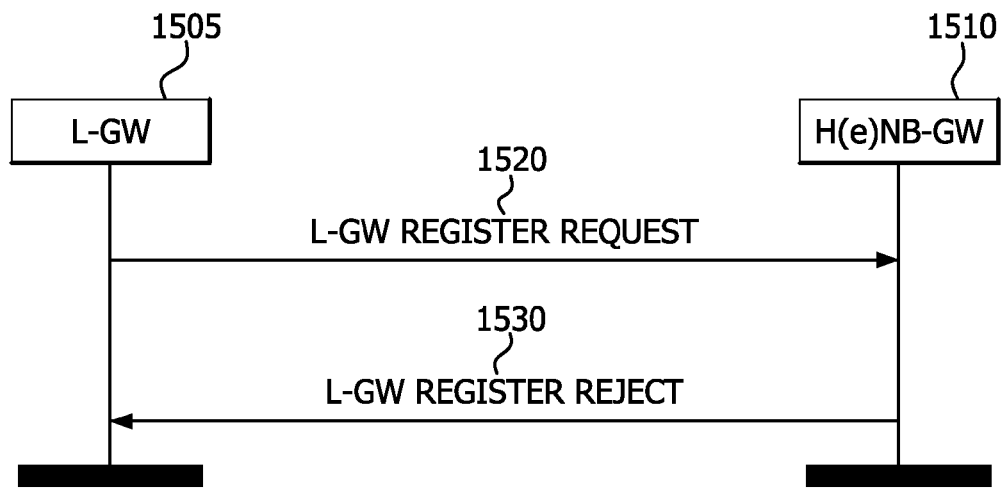
FIG. 15 shows an example call-flow diagram for an unsuccessful L-GW register procedure.

FIG. 15 shows an example call-flow diagram 1500 for an unsuccessful L-GW register procedure. An L-GW 1505 and an H(e)NB-GW 1510 are shown, although any other nodes or elements may be used in the procedure. The L-GW 1505 may send an L-GW REGISTER REQUEST 1520 to the H(e)NB-GW 1510. The L-GW REGISTER REQUEST 1520 may be sent by the L-GW 1505 if the L-GW 1505 needs to commence operations and/or requires service from a core network (not shown) via, for example, the H(e)NB-GW 1510. The L-GW 1505 may provide its LHN ID and/or transport layer address during the registration process and the LHN ID and/or transport layer address may be included in the L-GW REGISTER REQUEST 1520. The L-GW 1505 may provide a capability, such as for example, support for SIPTO and/or LIPA services, or any restrictions with respect to SIPTO and/or LIPA services. The L-GW 1505 may include any capability information in the L-GW REGISTER REQUEST 1520.

An HNB (not shown) may provide a list of attached H(e)NBs and/or the operational parameters included in an HNB REGISTRATION REQUEST message. If the L-GW 1505 supports direct interface relocation to other L-GWs (not shown), the L-GW 1505 may provide the direct interface signaling TNL Address IE to the core network (via H(e)NB-GW 1510) in, for example, the L-GW REGISTER REQUEST 1520.

If the registration is unsuccessful, the core network (via H(e)NB-GW 1510) may respond by transmitting an L-GW REGISTER REJECT 1530 message (or an HNB REGISTER REJECT message) to the L-GW 1505. A typical cause value for unsuccessful registration may include radio network layer causes, such as for example, unauthorized location, unauthorized attached HNB, overload, L-GW parameter mismatch (for example, a capability mismatch considering the service level agreement between the operator and the host party of the L-GW), or an unspecified cause. Any of these causes may be included in the L-GW REGISTER REJECT 1530 message as a cause IE. For example, if the cause IE is set to "overload," the HNB may not retry registration to the same H(e)NB-GW 1510 for at least the duration indicated by, for example, a Backoff Timer IE.

One skilled in the art will recognize that the messages described above with respect to FIG. 15 may be any type of message and the information included in each of the messages may be included in any type of message. Similarly, the messages may be transmitted in any order and not only in the order described in the example above.

If a core network (via for example, an H(e)NB-GW) receives a duplicate L-GW REGISTER REQUEST message (for example, for an already registered L-GW identified by the same unique L-GW identity or LHN identity), the new L-GW REGISTER REQUEST message may override the existing registration. The handling of the new L-GW REGISTER REQUEST message may be performed according to the examples described above.

Figure 16:
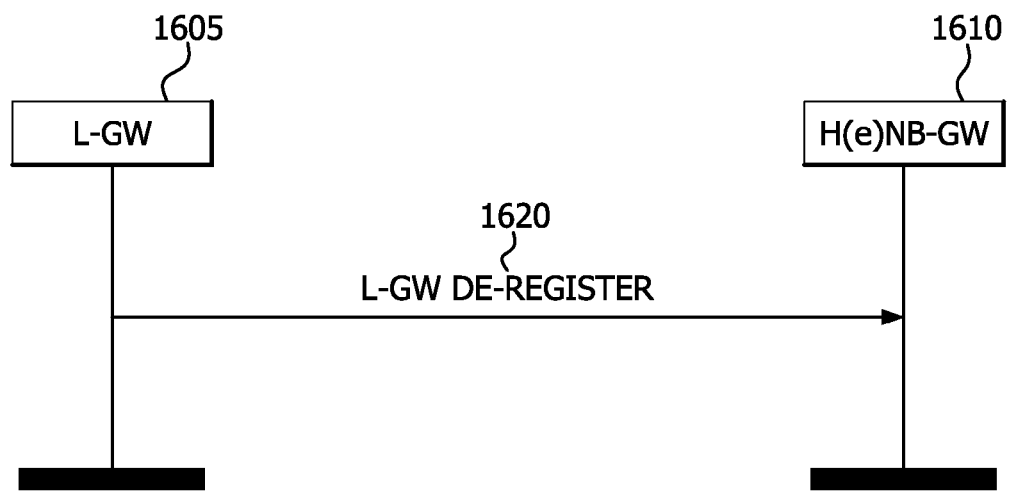
FIG. 16 shows an example call-flow diagram for an L-GW deregistration procedure that originates at the L-GW.

FIG. 16 shows an example call-flow diagram 1600 for an L-GW deregistration procedure that originates at the L-GW. An L-GW 1605 and an H(e)NB-GW 1610 are shown, although any other nodes or elements may be used in the procedure. The L-GW 1605 may determine that it needs to terminate operations with the H(e)NB-GW 1610. The L-GW 1605 may optionally terminate connections with attached H(e)NBs before initiating termination with the H(e)NB-GW 1610. The L-GW 1605 may transmit an L-GW DE-REGISTER 1620 message to the H(e)NB-GW 1610. If the core network (not shown) receives the L-GW DE-REGISTER 1620 message (via the H(e)NB-GW 1610), the core network may clear all related resources associated with the L-GW 1605. Cause values for the de-register process may include radio network layer causes, such as for example, normal or unspecified. The cause values may be included in, for example, the L-GW DE-REGISTER 1620 message.

One skilled in the art will recognize that the messages described above with respect to FIG. 16 may be any type of message and the information included in each of the messages may be included in any type of message. Similarly, the messages may be transmitted in any order and not only in the order described in the example above.

Figure 17:
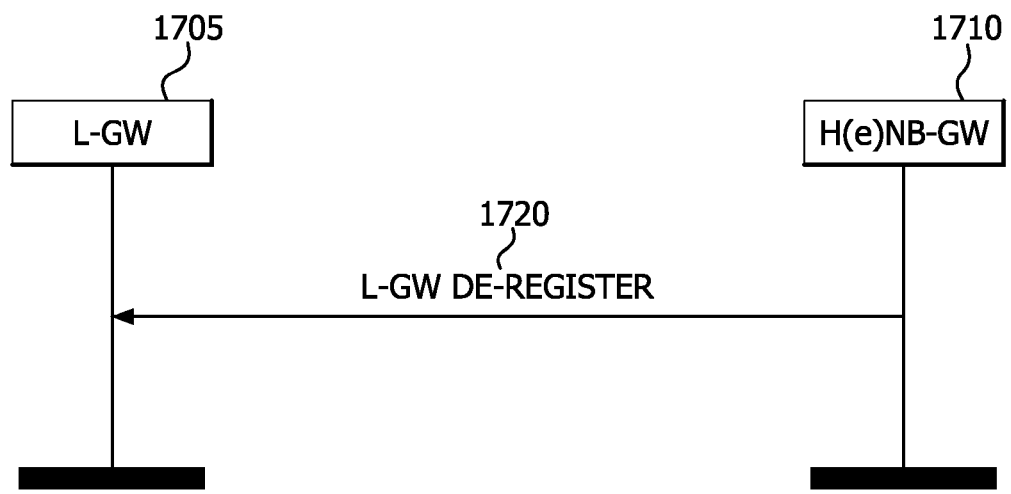
FIG. 17 shows an example call-flow diagram for an L-GW deregistration procedure that originates at the H(e)NB-Gateway (GW).

FIG. 17 shows an example call-flow diagram 1700 for an L-GW deregistration procedure that originates at the H(e)NB-GW. An L-GW 1705 and an H(e)NB-GW 1710 are shown, although any other nodes or elements may be used in the procedure, such as those shown in FIGS. 7-12. The core network (not shown) (via the H(e)NB-GW 1710) may determine that it needs to terminate operations with the L-GW 1705. The core network (via the H(e)NB-GW 1710) may transmit an L-GW DE-REGISTER 1720 message to the L-GW 1705. The core network may clear all related resources associated with the L-GW 1705. Cause values for the de-register process may include radio network layer causes, such as for example, overload or unspecified causes. The cause values may be included in IEs in, for example, the L-GW DE-REGISTER 1720 message. If the cause IE in the L-GW DE-REGISTER 1720 message is set to "overload," the L-GW may not retry registration to the same H(e)NB-GW 1710 for at least the duration indicated by, for example, a Backoff Timer IE.

One skilled in the art will recognize that the messages described above with respect to FIG. 17 may be any type of message and the information included in each of the messages may be included in any type of message. Similarly, the messages may be transmitted in any order and not only in the order described in the example above.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer. Although examples are described with respect to a WTRU and/or a user, one of ordinary skill in the art will appreciate that either the WTRU or a user may perform the features or elements described in the examples.

What is claimed is:

1. A method for use in a wireless transmit/receive unit (WTRU), the method comprising:
   receiving a service from a Local Gateway (L-GW) via a first base station (BS) that belongs to a Local Home Node B (HNB) Network (LHN);
   maintaining an LHN list that includes information related to at least the LHN;
   receiving a message that includes information related to the LHN and information indicating whether a second BS is capable of providing the service from the L-GW, wherein the second BS belongs to the LHN and is configured to communicate with the L-GW;
   determining whether the second BS services a Closed Subscriber Group (CSG), to which the WTRU is a member, based on a broadcasted CSG identifier (ID) being included in a list of allowed CSG IDs stored in the WTRU;
   performing a handover to the second BS based at least on the LHN list and the received message; and
   receiving the service from the L-GW via the second BS.

2. The method of claim 1, wherein the service includes a Selected Internet Protocol (IP) Traffic Offload (SIPTO) service.

3. The method of claim 1, wherein the service includes a Local Internet Protocol (IP) Access (LIPA) service.

4. The method of claim 1, wherein the LHN list includes an LHN ID of the LHN.

5. The method of claim 1, wherein the LHN list includes information related to LHNs from which the WTRU prefers to receive the service.

6. The method of claim 1, wherein the LHN list includes information related to LHNs that are capable of providing a Selected Internet Protocol (IP) Traffic Offload (SIPTO) service.

7. The method of claim 1, wherein the LHN list includes information related to LHNs that are capable of providing a Local Internet Protocol (IP) Access (LIPA) service.

8. The method of claim 1, wherein the LHN list includes information related to at least one LHN that the WTRU is allowed to access.

9. The method of claim 8, wherein the at least one LHN that the WTRU is allowed to access is determined by an operator of a network.

10. The method of claim 1, wherein the LHN list includes information related to at least one of LHNs or BSs that the WTRU or a user of the WTRU approved for attachment.

11. The method of claim 1, further comprising receiving a detach request message that includes a reattach target, the reattach target indicating that the WTRU should attach to the second BS for the service received from the L-GW.

12. The method of claim 1, wherein the performing the handover further comprises determining that the second BS belongs to the LHN.

13. The method of claim 12, wherein the determining that the second BS belongs to the LHN comprises determining that information related to the LHN is included in the LHN list.

14. The method of claim 1, further comprising stopping the service received from the first BS prior to performing the handover.

15. The method of claim 1, further comprising maintaining a list of information related to BSs that the WTRU is allowed to access.

16. The method of claim 15, wherein the performing the handover is performed on a further condition that information related to the second BS is included in the list of information related to BSs.

17. A wireless transmit/receive unit (WTRU) comprising:
   a receiver configured to receive a service from a Local Gateway (L-GW) via a first base station (BS), wherein the first BS belongs to a Local Home Node B (HNB) Network (LHN);
   a memory configured to store an LHN list that includes information related to at least the LHN;
   the receiver configured to receive a message that includes information related to the LHN and information indicating whether a second BS is capable of providing the service from the L-GW, wherein the second BS belongs to the LHN and is configured to communicate with the L-GW;

a processor configured to determine whether the second BS services a Closed Subscriber Group (CSG), to which the WTRU is a member, based on a broadcasted CSG identifier (ID) being included in a list of allowed CSG IDs stored in the WTRU;

the processor configured to perform a handover to the second BS based at least on the LHN list and the received message; and the receiver configured to receive the service from the L-GW via the second BS.

18. A method for use in a wireless transmit/receive unit (WTRU), the method comprising:
receiving a message that includes:
   a Local Home Node B (HNB) Network (LHN) ID that identifies an LHN; and
   a Local Internet Protocol (IP) Access (LIPA) indication that indicates whether the LHN supports LIPA services;

selecting to a cell that belongs to the LHN on a condition that the LHN ID is included in a list of allowed LHNs stored in the WTRU and that the LIPA indication indicates that the LHN supports LIPA services;

determining whether the cell services a Closed Subscriber Group (CSG), to which the WTRU is a member, based on a broadcasted CSG identifier (ID) being included in a list of allowed CSG IDs stored in the WTRU; and receiving a service from the cell.

19. The method of claim 18, wherein the selecting to the cell is performed on a further condition that the cell services a CSG and information related to the CSG is included in the list of allowed CSGs stored in the WTRU.

20. The method of claim 18, wherein the selecting to the cell is performed on the further condition that the cell is serviced by a base station (BS) and information related to the BS is included in a list of allowed BSs stored in the WTRU.

* * * * *